US008676666B2

(12) United States Patent
Khachatrian et al.

(10) Patent No.: US 8,676,666 B2
(45) Date of Patent: Mar. 18, 2014

(54) SYSTEM FOR ASSESSING ENVIRONMENTAL IMPACT OF PROCESSING PRINT JOBS

(75) Inventors: Araz Khachatrian, Pittsford, NY (US); Lewis S. Snow, La Crescenta, CA (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 577 days.

(21) Appl. No.: 12/638,439

(22) Filed: Dec. 15, 2009

(65) Prior Publication Data

US 2011/0145085 A1  Jun. 16, 2011

(51) Int. Cl.
  *G06Q 30/00* (2012.01)
  *G06Q 30/06* (2012.01)
(52) U.S. Cl.
  CPC .......... *G06Q 30/0619* (2013.01); *G06Q 30/018* (2013.01); *G06Q 30/0601* (2013.01)
  USPC .................. 705/26.44; 705/317; 705/26.1
(58) Field of Classification Search
  USPC ..................................... 705/26.1, 317, 26.44
  See application file for complete search history.

(56) References Cited

U.S. PATENT DOCUMENTS

| | | | |
|---|---|---|---|
| 5,758,328 A * | 5/1998 | Giovannoli ................. | 705/26.4 |
| 6,397,197 B1 * | 5/2002 | Gindlesperger ............. | 705/37 |
| 2002/0128953 A1 * | 9/2002 | Quallen et al. .............. | 705/37 |
| 2003/0105832 A1 * | 6/2003 | Kaneko ........................ | 709/217 |
| 2003/0182137 A1 * | 9/2003 | Whitmarsh et al. ......... | 705/1 |
| 2004/0078277 A1 * | 4/2004 | Gindlesperger .............. | 705/26 |
| 2008/0208733 A1 * | 8/2008 | Robb et al. .................. | 705/37 |
| 2009/0281878 A1 * | 11/2009 | Rane et al. ................... | 705/11 |
| 2009/0287806 A1 * | 11/2009 | Hamilton et al. ........... | 709/223 |
| 2010/0100402 A1 * | 4/2010 | Shah et al. ................... | 705/7 |
| 2011/0043846 A1 | 2/2011 | Sprague et al. | |
| 2011/0043847 A1 | 2/2011 | Purohit et al. | |
| 2011/0047034 A1 | 2/2011 | Purohit et al. | |

FOREIGN PATENT DOCUMENTS

JP     2006277197 A  * 10/2006

* cited by examiner

*Primary Examiner* — Amee A Shah
(74) *Attorney, Agent, or Firm* — Gibb & Riley, LLC

(57) ABSTRACT

A system for assessing environmental impact of processing print jobs includes a processor and a computer-readable storage medium. The computer-readable storage medium is in communication with the processor and comprises one or more programming instructions for: electronically receiving a campaign specification data structure including at least one job specification; and operatively selecting a plurality of vendors from a database. Each of the selected vendors is capable of performing a job as operatively specified by the at least one job specification of the campaign specification data structure. The computer-readable storage medium is in communication with the processor and also includes one or more programming instructions for generating a plurality of environmental impact assessments corresponding to the campaign specification data structure. Each of the plurality of environmental impact assessments is operatively associated with one of the selected capable vendors.

10 Claims, 29 Drawing Sheets

HOME | NEW JOBS | JOB STATUS | TEMPLATES | VENDORS | REPORT

JOB
- Description
- Component Definition
- Component Press: text
- Component Additional: text
- Assembly
- Confirmation
- Preview Rates

Commercial Print Job paper

Save Job | Cancel Job

Create Template

Preview Rates: Step 7 of 7

Ratecard Prices

Filter Vendors By:   Regions ▼   England ▼

1000 ▶   Price @ Quantity

| Supplier | Price | |
|---|---|---|
| Jblackburn Pilot | Incapable | ☐ |
| TL Visuals Pilot | Incapable | ☐ |
| Alderson Pilot | Incapable | ☐ |
| Mclavs Pilot | £633.69 | ☐ |
| PhilipMyers Pilot | Incapable | ☐ |

404 SUPPLIERS          402 PRICES

File Attachment  None          Select File Attachment

BACK          SUBMIT TO CHECKED VENDORS

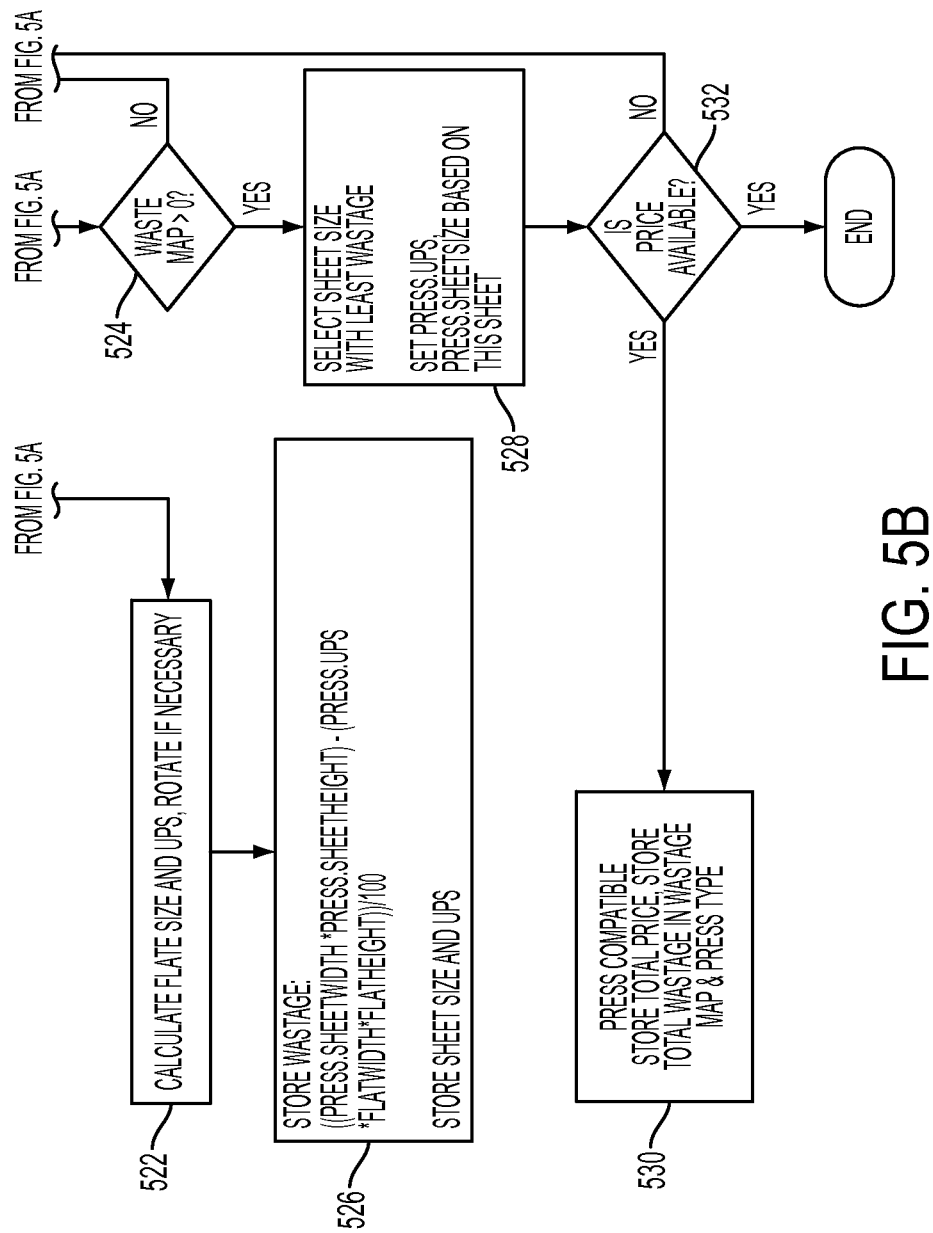

HOME | NEW JOBS | JOB STATUS | TEMPLATES | VENDORS | REPORT

JOB
- Description
- Component Definition
- Component Press: text
- Component Additional: text
- Assembly
- Confirmation
- Preview Rates

Commercial Print Job paper  [Save Job] [Cancel Job]
 [Create Template]

Preview Rates: Step 7 of 7

Ratecard Prices

Filter Vendors By: [Regions ▼]  [England ▼]

| Supplier | Waste | 1000 ▼ Price | Price @ Quantity |
|---|---|---|---|
| Jblackburn Pilot | 6% | Incapable ☐ | |
| TL Visuals Pilot | 6% | Incapable ☐ | |
| Alderson Pilot | 8% | Incapable ☐ | |
| Mclays Pilot | 3% | £633.69 ☐ | |
| PhilipMyers Pilot | 9% | Incapable ☐ | |

File Attachment  None    Select File Attachment

[BACK]    [SUBMIT TO CHECKED VENDORS]

FIG. 7

| FACTORS | MATERIALS CHOICE | ENERGY USE | SOLID RESIDUE | LIQUID RESIDUE | GASEOUS RESIDUES |
|---|---|---|---|---|---|
| FULLY DIGITAL PREPRESS | 1 | 1 | 1 | 1 | 1 |
| WATERLESS OFFSET PRINTING | 1 | 0 | 1 | 0 | 1 |
| PLATE MAKING | 0 | 0 | 0 | 0 | 0 |

FIG. 8

Advanced Sourcing Workbench

▶ Environmental Factors

The following sections collect information on your environmental practices and sensitivities.

If you answer "Yes" leave the percentage at 100. If you answer "No" indicate the percentage "Green" Preview Price."

If you answer "Yes" leave the percentage at 100. If you answer "No" indicate the percentage question isn't applicable to your operation enter "N/A" in both fields.

▶ Prepress Green Factors

| | Materials Choice |
|---|---|
| Is your prepress fully digital | Yes ∨ |
| Do you use non-hazardous chemicals and finishers in platemaking | No ∨ |
| Do you use water-processed presensitized plates | Yes ∨ |
| Is your imaging fully electronic | Yes ∨ |

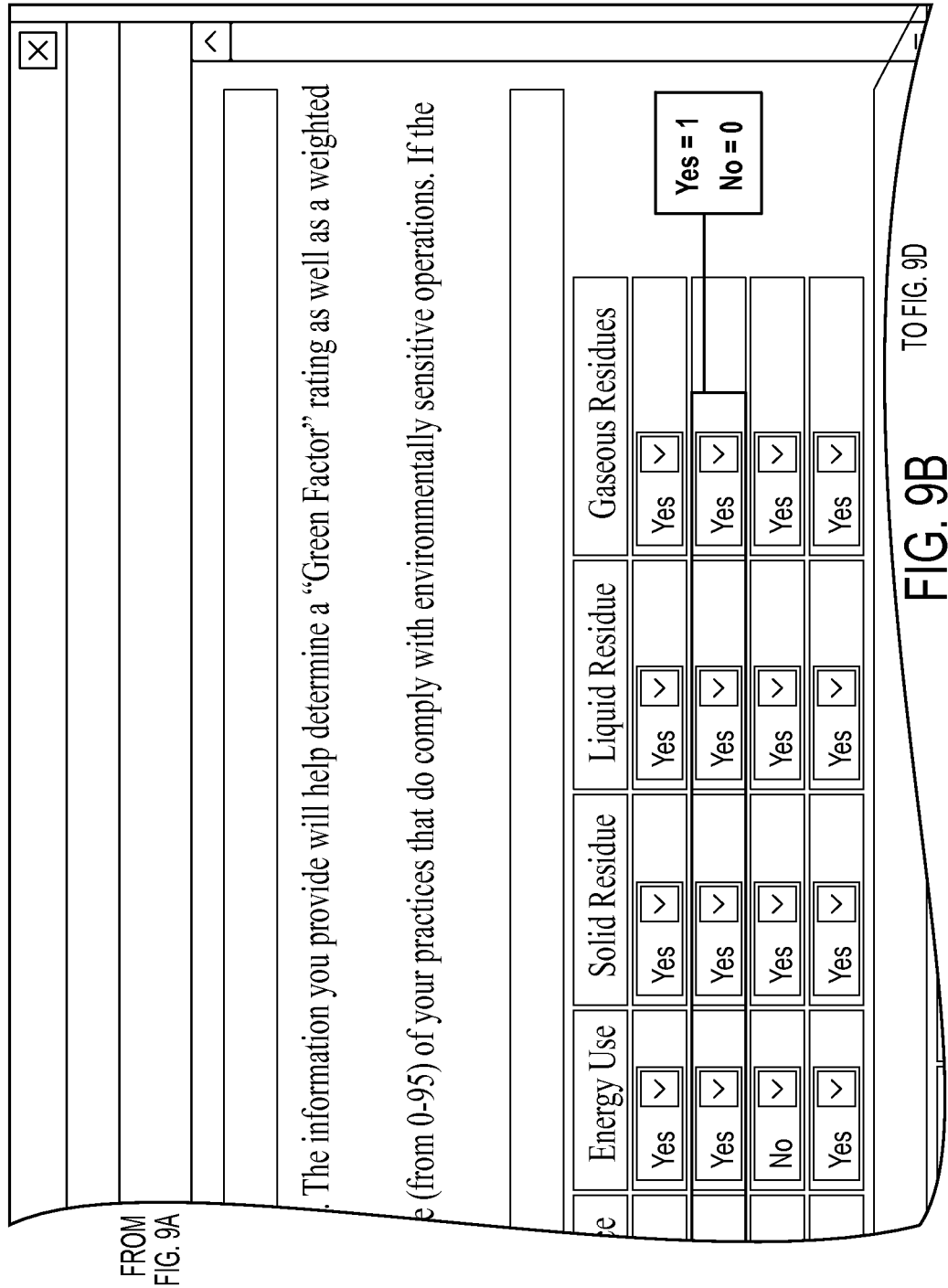

▼ Press Green Factors

| | Materials Choice |
|---|---|
| Do you use waterless offset printing | No ∨ |
| Do you minimize color changes | Yes ∨ |
| Do you run similar jobs back to back | Yes ∨ |
| Do you dedicate presses for specific inks or ink combinations | Yes ∨ |
| Do you have Web detectors and automatic splicers | No ∨ |
| Do you have a cooling system (evaporation reduction) | Yes ∨ |
| Do you use alcohol-free printing | No ∨ |

▼ Paper Green Factors

| | Materials Choice | Energy |
|---|---|---|
| Do you use recycled papers | Yes ∨ | Yes ∨ |
| Do you use FSC (or other similarly certified) papers | No ∨ | No ∨ |

[Previous Page]

FROM FIG. 9A

| Energy Use | Solid Residue | Liquid Residue | Gaseous Residues |
|---|---|---|---|
| No ⌄ | No ⌄ | No ⌄ | No ⌄ |
| Yes ⌄ | Yes ⌄ | Yes ⌄ | Yes ⌄ |
| Yes ⌄ | Yes ⌄ | Yes ⌄ | Yes ⌄ |
| Yes ⌄ | Yes ⌄ | Yes ⌄ | Yes ⌄ |
| No ⌄ | No ⌄ | No ⌄ | No ⌄ |
| Yes ⌄ | Yes ⌄ | Yes ⌄ | Yes ⌄ |
| Yes ⌄ | No ⌄ | No ⌄ | No ⌄ |

FROM FIG. 9B

| Use | Solid Residue | Liquid Residue | Gaseous Residues |
|---|---|---|---|
| Yes ⌄ | Yes ⌄ | Yes ⌄ | Yes ⌄ |
| No ⌄ | No ⌄ | No ⌄ | No ⌄ |

FROM FIG. 9C

Submit    Next Page    Print Page    Print All Pages

FIG. 9D

|  | PLATE MAKING PRICE | PRINTING PRICE | PLATE MAKING "GREEN" SCORE | PRINTING "GREEN" SCORE | NORMALIZED PLATE MAKING SCORE | NORMALIZED PRINTING SCORE | ACTUAL PRICE | "GREEN" WEIGHTED PRICE |
|---|---|---|---|---|---|---|---|---|
| VENDOR 1 | 100 | 500 | 0 | 0 | 3 | 3 | 600 | 960 |
| VENDOR 2 | 200 | 400 | 5 | 4 | -2 | -1 | 600 | 440 |

| Emmisions (tons) | | |
|---|---|---|
| Hazardous Air Pollutants (pounds) | 1,050.000000 | 525 |
| Wastewater (gallons) | 9,526,500.000000 | 4,763,250 |
| | | |
| | | |
| Assumptions | | |
| 1 ton of paper = 400 reams = 200,000 sheets1 | | |
| 1 tree makes 16.67 reams of copy paper or 8,333 sheets1 | | |
| 1 ream [500 sheets] uses 6% of a tree [and those add up quickly]1 | | |
| Source | | |
| | 1 | www.conservatree.com |
| | | http://www.printgreener.com/earthday.html#citation1 |
| | | |
| | | trees |
| | skid = 24 trees | 24 |
| | case = 24/40 | 0.6 |
| | ream = 0.6/10 | 0.006 |
| | sheet = .06/500 | 0.00012 |
| | End user prints 4,000 yr | 0.48 |
| | | |
| | | En |
| By comparison, the average American household consumes 11,040kWh(920 per | | |
| This equates to 37,679,520 BTUs per year or 3,139,960 per month | | |
| Source = http://www.tennesseepolicy.org/main/article.php?article_id=367 | | |

TO FIG. 11G

Conversion Factors
*Average Energy Content of Various Fuels*

| 1 kilowatt hour of electricity | = | 3413 British thermal units (Btu) |
|---|---|---|
| Source = http://www.uwsp.edu/CNR/wcee/keep/Mod1/Whatis/energyrecourcestal | | |

FROM FIG. 11F

| | 1,250 | | |
|---|---|---|---|
| | 800 | 400 | 250.000000 |
| | 8,144.000 | 4,072.000 | 6,149,000.000000 |

TO FIG. 11H ergy Assumptions
month) in an entire year, according to the Energy Information Administration bles.htm

FIG. 11G

HOME | NEW JOBS | JOB STATUS | TEMPLATES | VENDORS | REPORT

JOB
- Description
- Component Definition
- Component Press: text
- Component Additional: text
- Assembly
- Confirmation
- Preview Rates Commercial Print Job
Green Factor Demo
Preview Rates: Step 7 of 7

Welcome buyer!
PREFERENCES | HELP | LOGOUT

Save Job | Cancel Job
Create Template

Ratecard Prices
Sort Vendors By: Preview Price ▼    All ▼

Price @ Quantity 100000       G R E E N

| Supplier | Price ▶ | | Factor ▶ | Weighted Price ▶ | |
|---|---|---|---|---|---|
| UK Demo Bidder7 | £7,166.44 | ☐ | 14 | £7,094.78 | ☐ |
| UK Demo Bidder2 | £7,327.78 | ☐ | 31 | £6,961.38 | ☐ |
| UK Demo Bidder6 | £8,372.31 | ☐ | 26 | £8,204.86 | ☐ |
| UK Demo Bidder5 | £9,075.66 | ☐ | 27 | £8,621.88 | ☐ |
| UK Demo Bidder3 | £9,661.50 | ☐ | 15 | £9,516.58 | ☐ |
| UK Demo Bidder4 | £10,215.92 | ☐ | 21 | £10,113.76 | ☐ |
| UK Demo Bidder1 | £29,496.12 | ☐ | 31 | £26,546.51 | ☐ |
| UK Demo Bidder10 | Incapable | | --- | Incapable | |

1402    1404    1406

File Attachment None    Select File Attachment

BACK    SUBMIT TO CHECKED VENDORS

| HOME | NEW JOBS | JOB STATUS | TEMPLATES | VENDORS | REPORT | | PREFERENCES | HELP | LOGOUT |

JOB
- Description
- Component Definition
- Component Press: text
- Component Additional: text
- Assembly
- Confirmation
- Preview Rates

Commercial Print Job
Green Factor Demo

Preview Rates: Step 7 of 7

[ Save Job ] [ Cancel Job ]
[ Create Template ]

Ratecard Prices

Sort Vendors By: [ Green Factor ▼ ] [ All ▼ ]

Price @ Quantity
100000

GREEN

| Supplier | Price ▼ | | Factor ▼ | Weighted Price ▼ | |
|---|---|---|---|---|---|
| UK Demo Bidder2 | £7,327.78 | ☐ | 31 | £6,961.38 | ☐ |
| UK Demo Bidder1 | £29,496.12 | ☐ | 31 | £26,546.51 | ☐ |
| UK Demo Bidder5 | £9,075.68 | ☐ | 27 | £8,621.88 | ☐ |
| UK Demo Bidder6 | £8,372.31 | ☐ | 26 | £8,204.86 | ☐ |
| UK Demo Bidder4 | £10,215.92 | ☐ | 21 | £10,113.76 | ☐ |
| UK Demo Bidder3 | £9,661.50 | ☐ | 15 | £9,516.58 | ☐ |
| UK Demo Bidder7 | £7,166.44 | ☐ | 14 | £7,094.78 | ☐ |
| UK Demo Bidder10 | Incapable | ☐ | ... | Incapable | ☐ |

1402   1404   1406

File Attachment None   Select File Attachment
1408

[ BACK ]   [ SUBMIT TO CHECKED VENDORS ]

FIG. 15

| HOME | NEW JOBS | JOB STATUS | TEMPLATES | VENDORS | REPORT | | | Welcome buyer! |
|---|---|---|---|---|---|---|---|---|
| | | | | | | | | PREFERENCES | HELP | LOGOUT |

JOB
- Description
- Component Definition
- Component Press:
- Component Additional: text
- Component Additional: text
- Assembly
- Confirmation
- Preview Rates Commercial Print Job
Green Factor Demo
Preview Rates: Step 7 of 7

[Save Job] [Cancel Job]
[Create Template]

Ratecard Prices

Sort Vendors By: Weighted Price ▼    All ▼

Price @ Quantity
100000                                    G R E E N

| Supplier | Price ▶ | | Factor ▶ | Weighted Price ▶ | |
|---|---|---|---|---|---|
| UK Demo Bidder2 | £7,327.78 | ☐ | 31 | £6,961.38 | ☐ |
| UK Demo Bidder7 | £7,168.44 | ☐ | 14 | £7,094.78 | ☐ |
| UK Demo Bidder 6 | £8,372.31 | ☐ | 26 | £8,204.86 | ☐ |
| UK Demo Bidder5 | £9,075.66 | ☐ | 27 | £8,621.88 | ☐ |
| UK Demo Bidder3 | £9,661.50 | ☐ | 15 | £9,516.58 | ☐ |
| UK Demo Bidder4 | £10,215.92 | ☐ | 21 | £10,113.76 | ☐ |
| UK Demo Bidder1 | £29,496.12 | ☐ | 31 | £26,546.51 | ☐ |
| UK Demo Bidder10 | Incapable | ☐ | ... | Incapable | ☐ |

1408      1402     1404     1406

File Attachment None    Select File Attachment

[BACK]    [SUBMIT TO CHECKED VENDORS]

SYSTEM FOR ASSESSING ENVIRONMENTAL IMPACT OF PROCESSING PRINT JOBS

BACKGROUND

1. Field of Invention

The present disclosure is generally related to print job processing, and more particularly, to a system for assessing environmental impact of processing print jobs.

2. Description of Related Art

Reverse auctions are commonly used to minimize the purchase price of items. In this style of auction the role of the buyer and the seller are reversed such that the seller engages in competitive bidding in which items are offered for sale at a bid price of the seller's choosing. The buyer can select among the bids. Some reverse auction rules require the buyer to select the lowest bid. By engaging in a reverse auction, also referred to as a procurement auction, a buyer can sometimes purchase items at a lower price than is available through more typically used commercial channels. These reverse auctions can place downward pricing pressure on the sellers facilitating them to cut costs, increase efficiency and/or minimize waste. These auctions are sometimes used to facilitate business-to-business transactions. However, executing the contract as specified by the transaction sometimes causes certain kinds of waste resulting in negative externalities that negatively affect the environment and/or the biosphere.

Some reverse auctions are organized by a broker (sometimes referred to as a market maker) using a marketplace. The buyers and/or sellers contract with the broker to agree to be bound to the marketplace rules and procedures. The broker also provides consulting services and other market facilitating tasks. Some of the tasks the broker may perform include: organizing the marketplace rules and procedures, culling a list of capable sellers, authoring sellers, training sellers, interfacing the sellers into electronic aspects of the marketplace, organizing the auction, and providing auction data services to buyers and sellers. Some of the broker services sometimes include data services involving communication among sellers, buyers, and the marketplace. For example, the sellers and buyers may communicate with the marketplace using Extensible Markup Language (referred to as "XML").

Advertising campaigns generally use a variety of advertising techniques. Purchasing for services utilizing these techniques may be obtained in a variety of ways, including via outsourcing. During 2007, marketers in the U.S. spent a total of $55.3 billion in direct mail advertisements, driving $686.7 billion in sales. By 2012, it is anticipated that American businesses will spend $61.7 billion on direct mail advertisements. In comparison, $1.2 billion will be spent on e-mail marketing and $39.7 billion will be spent on Internet (non-e-mail) marketing. In 2012, 27% of marketing budgets will be allocated to direct mail advertisements.

However, environmental aspects are not always fully accounted for in these reverse auctions. Specifically, by comparing only the prices offered by the vendors, a buyer in a reverse-style auction may not fully appreciate, quantify the vendor's impact on the environment, and/or be able to meet its environmental goals. Some vendors' processes may cause negative externalities (e.g., such as those previously mentioned) that negatively affect the environment and/or the biosphere. In a survey by Hansa/GCR of 600 decision makers representing a wide range of U.S. companies, more than half (58 percent) large and mid-size companies are trying to reduce printer-related waste.

SUMMARY

In one embodiment of the present disclosure, a system for assessing environmental impact of processing print jobs includes a processor and a computer-readable storage medium. The computer-readable storage medium is in communication with the processor and comprises one or more programming instructions for: electronically receiving a campaign specification data structure including at least one job specification; and operatively selecting a plurality of vendors from a database. Each of the selected vendors is capable of performing a job as operatively specified by the at least one job specification of the campaign specification data structure. The computer-readable storage medium in communication with the processor also includes one or more programming instructions for generating a plurality of environmental impact assessments corresponding to the campaign specification data structure. Each of the plurality of environmental impact assessments is operatively associated with one of the selected capable vendors.

In another embodiment of the present disclosure, a system for assessing environmental impact of processing print jobs includes a processor and a computer-readable storage medium. The computer-readable storage medium is in communication with the processor and comprises one or more programming instructions for implementing an accumulative waste calculation algorithm, comprising: electronically retrieving from a database a list of vendors capable of performing at least one job for printing a plurality of images; electronically retrieving from the database a list of presses for each vendor of the list of vendors; electronically generating a number of images that are printable for each sheet capable of being utilized by each press of the list of presses for each vendor of the list of vendors; and selecting a sheet capable of being utilized by a press of a list of presses for a vendor, said sheet being selected as a function of the calculated number of images that are printable on said sheet and an environmental impact assessment.

In another embodiment of the present disclosure, a system for assessing environmental impact of processing print jobs includes a processor and a computer-readable storage medium. The computer-readable storage medium is in communication with the processor and comprises one or more programming instructions for: electronically receiving a campaign specification data structure including at least one job specification; operatively selecting a plurality of vendors from a database, wherein each of the selected vendors is capable of performing a job as operatively specified by the at least one job specification of the campaign specification data structure; and generating a plurality of prices corresponding to the campaign specification data structure, wherein each of the plurality of prices is operatively associated with one of the selected capable vendors, and generating a plurality of environmental impact assessments corresponding to the campaign specification data structure, wherein each of the plurality of environmental impact assessments is operatively associated with one of the selected capable vendors and is adapted to offset one of the plurality of prices.

BRIEF DESCRIPTION OF THE DRAWINGS

These and other advantages will become more apparent from the following detailed description of the various embodiments of the present disclosure with reference to the drawings wherein:

FIG. 4 shows a web-browser based buyer's view showing vendors' preview prices in accordance with the present disclosure;

FIG. 7 shows a web-browser based buyer's view showing vendors' preview prices and respective wastage in accordance with the present disclosure;

FIG. 8 shows a matrix for calculating environmental impact assessments in accordance with the present disclosure;

FIG. 9 includes subparts FIGS. 9A-9D and shows a GUI interface for submitting data into the marketplace of FIG. 1 in accordance with the preset disclosure;

FIG. 10 shows a chart for exemplary vendor green weighted price calculations in accordance with the present disclosure;

FIGS. 14, 15, and 16 show several views a buyer and/or a document advisor may view utilizing a user interface of the marketplace of FIG. 1 in accordance with the present disclosure.

DETAILED DESCRIPTION

Particular embodiments of the present disclosure are described herein below with reference to the accompanying drawings. In the following description, well-known functions or constructions are not described in detail to avoid obscuring the present disclosure in unnecessary detail.

Figure 1:
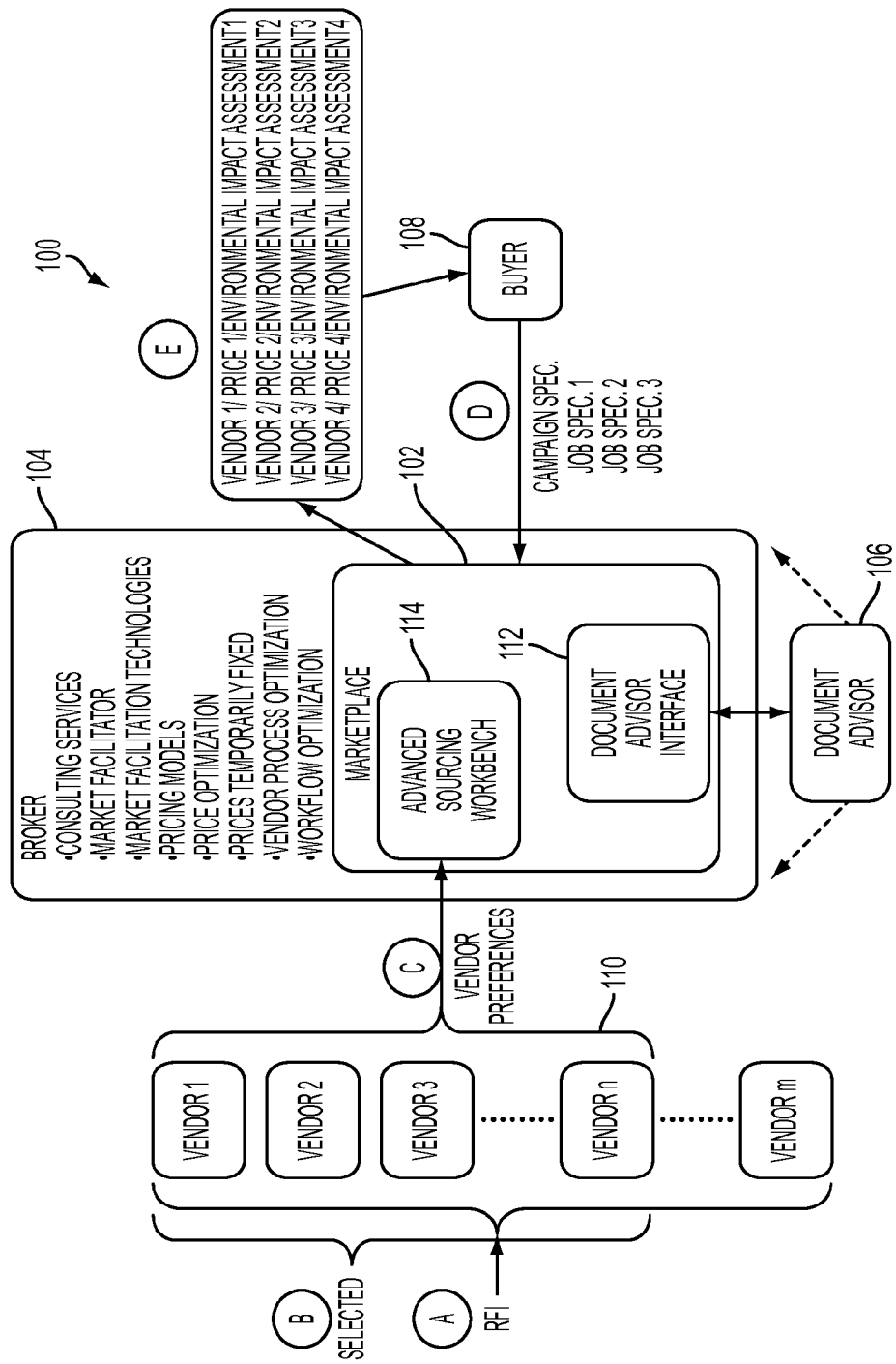
FIG. 1 shows a block diagram of a system for assessing the environmental impact of processing print jobs in accordance with the present disclosure.

Referring to the drawings, FIG. 1 shows a system 100 for assessing an environmental impact of processing one or more print jobs. System 100 includes a marketplace 102 organized and facilitated by a broker 104. The marketplace 102 may be implemented utilizing a personal computer, a server-based computer, a processor, hardware, software, software in execution, in virtualization, utilizing CPLDs, PALs, PLDs, FPGAs, one or more servers, firmware, bytecode, microcode, by an operative set of processor executable instructions configured by execution by at least one processor, the like, or some combination thereof. System 100 includes stages A, B, C, D, and E. The stages may occur in serial, in parallel, step-wise, or in any ordering. The letter designation herein is only to facilitate referencing by the description.

Marketplace 102 is organized by broker 104. Broker 104 can provide the marketplace 102 and facilitates transactions. The transactions may be facilitated by broker 104 by providing legal services, the contractual framework, and the market rules and procedures. Broker 104 also provides: (1) consulting services, (2) facilitates the market, (3) provides market facilitation technologies, (4) provides pricing models, (5) optimizes prices, (6) provides the legal framework so that prices may be temporarily fixed during the bidding process, (7) provides vendor process optimization services, (8) facilitate the achievement of environmental goals by one or more parties, and/or (9) optimizes the workflow.

System 100 also includes document advisor 106 (referred to herein as "DA 106"). DA 106 can facilitate price optimization of print and non-print related commodities relating to advertisement campaigns and other print jobs. To conduct large scale enterprise style advertising campaigns, DA 106 procures a broad range of services and goods for buyer 108. These enterprise services may utilize different equipment, consumables, and various associated data exchanges. Marketplace 102 enables DA 106 to procure a broader range of services as part of a campaign such as an advertising campaign e.g., job types selected from Direct Mail Campaign type jobs as discussed in more detail below. Rather than having the DA 106 use non-standard tools to store and utilize data to procure various products through non-print market procurement means, which leads to loss of revenue for broker 104, marketplace 102 can facilitate procurement by buyer 108 of various job types relating to advertising campaigns including non-print based services relating to advertising campaigns. Some of these services may also be offered by broker 104 or may simply be facilitated by broker 104 using marketplace 102.

Some of the jobs required for these goods and services are available for procurement via marketplace 102 by procuring from one of vendors 110. Vendors 110 includes vendor 1 through vendor m (including vendor n). The letters n and m designate that an arbitrary number of vendors are used with n≤m. Some of the services offered by vendors 110 include job types chosen from: direct mail campaign catalogs, direct mail campaign advertising, and direct mail non-printable services, which may be provided to buyer 108 along with direct mail campaign services (discussed in more detail below). Advertising services and nonprintable services are deliverable through marketplace 102.

An advertising campaign ties together several jobs, e.g., an advertising campaign is a container for multiple jobs. Jobs grouped into a campaign may inherit some properties from the campaign by default, which is also discussed in more detail below. Each job may have multiple components as part of the campaign specification. These workflows may be configurable by DA 106 depending upon the information entered via document advisor interface 112.

During stage A, requests for information (also referred to herein as "RFIs") are submitted to vendors 1 through m to elicit information from vendors 110. Stage A may take up to nine months and may involve dozens of support individuals (e.g., for the case where there are almost 300 vendors within vendors 110). After reviewing RFI submittals, stage B culls vendors 110 to select vendors 1 through n from vendors 110. During stage C, vendors 1 through n of vendors 110 enter vendor preferences including about 2,000 price points into a database 202 (see FIG. 2) through advanced sourcing workbench 114. Also during stage C, vendors 1 through n enter into database 202 environmental impact parameters including manufacturing processes information relating to its effect on the environmental and/or biosphere. The database 202 is part of marketplace 102. Document advisor 106 may assist vendors 1 through n by reviewing and adjusting information including the vendor preferences, e.g., the price points, environmental parameters, and/or environmental goals utilizing document advisor interface 112. Additionally or alternatively, document advisor 106 may further limit the list of authorized vendors that can participate in transactions utilizing marketplace 102.

During stage D, buyer 108 inputs a campaign-specification data structure (e.g., campaign specification data structure 226 of FIG. 2), including one or more job specifications (e.g., job specification 228 of FIG. 2), into marketplace 102. A campaign-specification data structure may include, but is not limited to, specifications relating to direct mail, advertising campaigns, print procurement, job environmental impact assessments, and printing print jobs. Buyer 108 may also input into the campaign-specification data structure 226 a request and/or requirement that the vendor be certified, e.g., via an environmental certification authority. The campaign-specification data structure (e.g., campaign specification data structure 226 of FIG. 2), may be in an XML format. XML provides a robust communications protocol, which may be changed, upgraded, and/or modified to facilitate communications. XML provides a mechanism (such as syntax) so that various computing systems can share information between or within applications, systems, organizations, computing systems and the like. During stage E, marketplace 102 determines which vendors of vendors 110 are capable and/or are authorized to perform one or more jobs as specified by the job specifications of the campaign specification data structure, and generates a list of vendors capable of producing (or performing) the jobs along with a preview price based on the rates collected during the sourcing effort, e.g., the vendor preferences entered during stage C. Also, during stage E, environmental aspects of choosing a vendor may be displayed, such as an environmental impact assessment. An environmental impact assessment may be wastage, green factors, a price offset, and/or may offset the preview prices. For example, the vendor's price may be increased or decreased (offset) to reflect a respective vendor's adherence to environmental standards, wastage requirements, wastage reduction or minimization, and/or environmental preferences of buyer 108 (discussed in more detail below).

An advertising campaign may have several job types, some of which may be related to unique jobs that facilitate the conduction of an effective advertising campaign. For example, advertising campaigns may include several non-printable jobs such as legal and translation services, format conversions, and security services, each one depending upon other jobs to perform those functions providing a multi-varied advertising campaign production environment. When buyer 108 generates a campaign specification data structure 226 (see FIG. 2) including several job specifications (e.g., job specification 228 of FIG. 2), the options are presented to buyer 108 based upon the entered configurations and preferences entered into marketplace 102 via advanced sourcing workbench 114 and/or via information communicated by document advisor 106.

Figure 2:
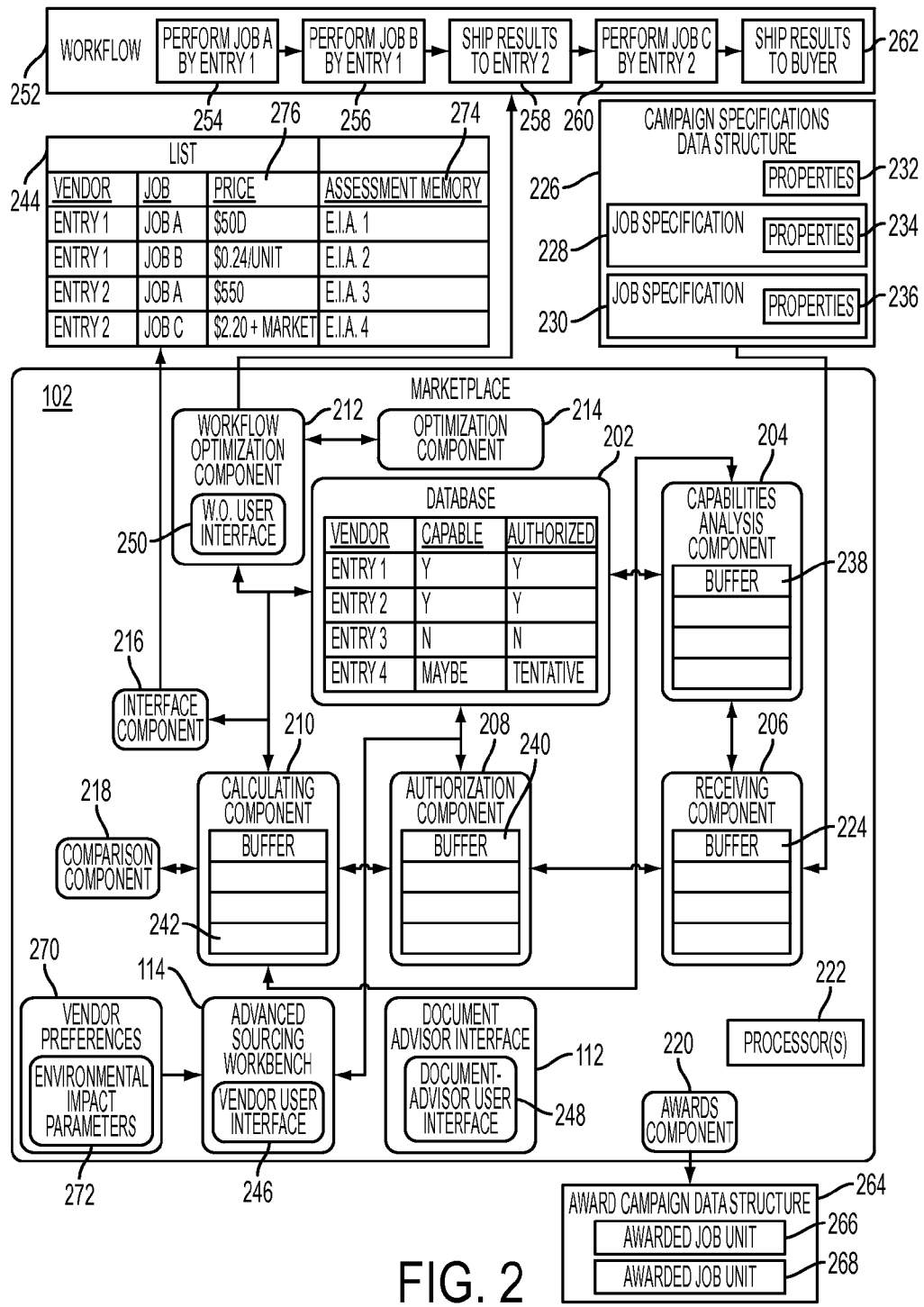
FIG. 2 shows a more detailed view of the marketplace of FIG. 1 in accordance with the present disclosure.

Referring to FIG. 2, a more detailed view of the marketplace 102 of FIG. 1 is shown. Marketplace 102 includes the document advisor interface 112, the advanced sourcing workbench 114, the database 202, a capabilities analysis component 204, a receiving component 206, an authorization component 208, a calculating component 210, a workflow optimization component 212, a optimization component 214, an interface component 216, a comparison component 218, and an awards component 220. Marketplace 102 may be implemented utilizing one or more processors 222. Marketplace 102 may utilize one or more memories, e.g., all buffers may be in a single memory or may be distributed among several memories. Additionally or alternatively, marketplace 102 may be implemented utilizing a personal computer, a server-based computer, a processor, hardware, software, software in execution, in virtualization, utilizing CPLDs, PALs, PLDs, FPGAs, one or more servers, firmware, bytecode, microcode, by an operative set of processor executable instructions configured by execution by at least one processor, the like, or some combination thereof.

Receiving component 206 includes buffer 224. Receiving component 206 electronically receives a campaign specification data structure 226, e.g., via an XML format. Campaign specification data structure 226 includes information to request advertising campaign goods and/or services, and includes job specifications 228 and 230. Campaign specification data structure 226 includes properties 232; and job specifications 228 and 230 include properties 234 and 236, respectively. A property 232, a property 234, and/or a property 236 may be related to environmental quality aspects, e.g., a buyer 108 may require that the vendor of vendors 110 (See FIG. 1) performing all or portions of the jobs specified by campaign specification data structure 226 must conform to an environmental standard, e.g., an environmental certification, or otherwise meet environmental criteria. A property 232 of campaign specification data structure 226 may be inheritable by a property of a job, e.g., a property of properties 234 may inherit from a property of properties 232. Additionally or alternatively, a property of a job specification may be bounded by a property of a campaign specification data structure, e.g., a property of properties 234 may be bound or constrained by property 232 of campaign specification data structure 226. For example, a campaign property 232 may be a campaign due date that sets a bound on all jobs, thus a property 234 of job specification 228, being a job due date, will be bounded by the campaign due date.

As previously mentioned, the campaign specification data structure 226 includes job specifications 228 and 230. The job specifications 228 and/or 230 may be associated with a job type. The job types associated with job specifications 228 and/or 230 may be from a direct mail campaign catalog, direct mail campaign advertising and direct mail non-printable services (see FIG. 3). Although campaign specification data structure 226 is shown as having two job specifications, i.e., job specifications 228 and 230, campaign specification data structure 226 may have more job specifications. Each job specification may by associated with a differing job type. Campaign specification data structure 226 may include information identifying requirements or preferences from a buyer for a campaign to be performed, including environmental preferences or requirements. For example, the campaign may involve several jobs which buyer 108 desires to procure and buyer 108 transmits (e.g., via XML) to marketplace 102 describing the job buyer 108 is trying to procure.

Receiving component 206 receives the campaign specification data structure 226 for electronic storage within buffer 224. Capabilities analysis component 204 is electronically coupled to receiving component 206. Capabilities analysis component 204 is also electronically coupled to database 202. Database 202 may be a SQL-based database and may include a plurality of vendor entries. Capabilities analysis component 204 includes a buffer 238. Capabilities analysis component 204 operatively and electronically receives the campaign specification data structure 226 from buffer 224 of receiving component 206. Capabilities analysis component 204 selects a set of capable entries from the database 202 and stores the selected set of capable entries in buffer 238. The selected entries from database 202 are vendors capable of performing one or more jobs as specified by campaign specification data structure 226, e.g., entry 1 may be a vendor capable of performing job specification 228 while entry 3 is a vendor that cannot perform any jobs as specified by campaign specification data structure 226. Although it is shown that capabilities analysis component 204 indicates capability using a flag within database 202, buffer 238 may indicate capability, some other buffer may indicate capability, and/or a memory within marketplace 102 may indicate capability. Additionally or alternatively, vendors of vendors 110 (See FIG. 1) that cannot perform one or more jobs as specified by campaign specification data structure 226 may be displayed or indicated to buyer 108 for reference or convenience.

Authorization component 208 electronically couples to receiving component 206 and to database 202. Authorization component 208 includes buffer 240. Authorization component 208 authorizes a set of entries of the database 202 conforming to a predetermined set of criteria, for example environmental aspects, environmental requirements, environmental standards, and/or the like. The authorized set of entries is stored in buffer 240 and may be selected from capable entries and/or from database 202.

Calculating component 210 includes buffer 242. Calculating component 210 electronically calculates a plurality of prices (shown in list 244) corresponding to campaign specification data structure 226 and stores the calculated prices in buffer 242. Additionally or alternatively, calculating component 210 can calculate one or more of environmental impact assessments 274. Each price is the price of a vendor performing a job, a total price from a vendor, a total price of a campaign based upon which vendor or vendors performs the jobs, and/or the price is a preview price based upon information from database 202, e.g., from rate information entered by a vendor of vendors 110 (see FIG. 1) via advanced sourcing workbench 114. One of environmental impact assessments 274 may be used to offset the price, may be the price offset, or may be an adjusted price adjusted to reflect the one or more job's affect on the environment.

Calculating component 210 electronically calculates a plurality of environmental impact assessments 274 (also shown in list 244) corresponding to the campaign-specification data structure 226. Each environmental impact assessment of 274 corresponds to a vendor of vendors 110 (see FIG. 1). Each environmental impact assessment 274 may be waste produced by a vendor of vendors 110 during the performance of all or a portion of a campaign as specified by the campaign specification data structure 226, for example, post press services wastage, assembly services wastage, forms press services wastage, a personalization-services wastage, a setup wastage, a run wastage and the like. Each environmental impact assessment 274 may be a function of the information submitted by vendors 110 (see FIG. 1) via vendor preferences 270 including environmental impact parameters 272 (discussed in more detail below). Each vendor may input into advanced sourcing workbench 114 one or more of vendor preferences 270 including one or more environmental impact parameters 272. Each environmental impact assessment 274 may be used to calculate an offset to one of the plurality of prices to calculate a green weighted price value. In other embodiments, the offset is the environmental impact assessment 274 and/or the green weight price value. The green weight price value is the cost of performing the job by a vendor of vendors 110 adjusted with an offset based on one or more environmental impact assessments 274 (a vendor of vendors 110 may have an itemized environmental impact assessment (not explicitly shown) or an aggregate environmental impact assessment (as shown) of environmental impact assessments 274). One or more of environmental impact assessments 274 may be adapted to correspond to a monetary value offset. For example, the green weighted price value is higher for a vendor of vendors 110 that has more environmental friendly practices and may be lower for a vendor of vendors 110 that has less environmental friendly practices (discussed in more detail below).

Comparison component 218 can determine the lowest price from the plurality of prices associated with the authorized set of entries and/or the lowest of the green weighted price values. The lowest price and/or the lowest green weighted price value may be flagged in calculating component 210 and/or may be communicated to a buyer 108, e.g., via interface component 216.

The prices 276 and environmental impact assessments 274 from calculating component 210 are communicated to a buyer via interface component 216. In addition, interface component 216 may electronically communicate (e.g., via XML) a list 244. List 244 may show the plurality of prices 276 and the plurality of environmental impact assessments 274 generated by calculating component 210. Each price of prices 276 and/or each environmental impact assessment of environmental impact assessments 274 may be associated with an entry of database 202 (such as entry 1, which corresponds to a particular vendor). Each price and/or each environmental impact assessment may be mapped to one or more capable and/or authorized entries in database 202 (e.g., via association of being a data structure within list 244). The prices 276 in list 244 may be various prices corresponding to an entry performing a job, one or more entries performing one or more jobs, and/or may be a preview price to start negotiations.

Marketplace 102 may also include advanced sourcing workbench 114 including vendor user interface 246. Vendor user interface 246 may be XML based, graphical user interface based, a client application running on a personal computer, php-based and running on a sever, and the like. Advanced sourcing workbench 114, in communication with database 202, can view or determine which of the vendors 110 have been selected for sourcing. Each vendor of vendors 110 that has been selected for sourcing can communicate one or more vendor preferences 270 including one or more environmental impact parameters 272 to database 202 utilizing the vendor user interface 246 of said advanced sourcing workbench 114. The one or more vendor preferences 270 communicated may include vendor capabilities, vendor prices corresponding to a vendor job to be performed, and/or one or more environmental impact parameters 272. These prices may be "rates", total price, formulae, and the like.

As previously mentioned, authorization component 208 authorizes a set of entries of the database 202 conforming to a predetermined set of criteria. The predetermined set of criteria may be a constraint corresponding to the vendor preferences 270 and/or an environmental based constraint (e.g., environmental certifications, environmental governmental standards, industry standards, arbitrary buyer preferences or standards, and/or the like). Also, marketplace 102 includes document advisor interface 112 including document-advisor user interface 248. Document-advisor user interface 248 is in electronic communication with document advisor 106 (see FIGS. 1 and 2). The document advisor 106 can utilize the document-advisor user interface 248 to review the vendor preferences 270 submitted to database 202, delete the vendor preferences 270, modify the vendor preferences 270, re-categorize the vendor preferences 270, authorize or de authorize entries in database 202, and select which vendors 110 are capable, e.g., designate which vendors of vendors 110 are capable of performing a job and/or a campaign as specified by campaign specification data structure 226.

Marketplace 102 also includes workflow optimization component 212 including workflow optimization user interface 250. Workflow optimization component 212 can generate workflow 252. Additionally or alternatively, workflow optimization user interface 250 can receive input from a user to control the generation of workflow 252. Workflow 252 may also be communicated to a buyer and may be associated with a price within list 244. Optimization component 214 may optimize workflow 252 to minimize the price a buyer pays to perform a campaign as specified by campaign specification data structure 226, minimizing one or more types of environmental waste, reduce environmental impact, and/or reduce negative externalities affecting the environment (e.g., reduce the carbon footprint of a campaign as specified by the campaign specification data structure 226). Optimization component 214 and workflow optimization component 212 may work together to generate workflow 252. Additionally or alternatively, as previously mentioned, optimization component 214 may optimize workflow 252 to minimize the environmental impact a vendor of vendors 110 causes when performing a campaign as specified by campaign specification data structure 226. Optimization component 214 and workflow optimization component 212 may work together to generate workflow 252 with a goal of minimizing one or more environmental impacts, achieve environmental impact goals, and/or achieve environmental goals.

Workflow 252 includes job units 254, 256, 258, 260, and 262. Job units may correspond to a job specification 228 or 230, campaign specification data structure 226, and the like. Additionally or alternatively, one of the job units 254, 256, 258, 260 or 262 may link together jobs. For instance, job unit 254 may be for job A to be performed by entry 1. Job unit 256 may be for job B to be performed by entry 1. Job unit 258 may be to ship the results to entry 2. Job unit 260 may be for entry 2 to perform job C. Job unit 262 may be for entry 2 to ship the results to the buyer. As shown in workflow 252, the workflow may utilize more than one vendor of vendors 110 (see FIG. 1). The environmental impact assessments 274 shown in list 244 may include aspects of shipping, for example: the carbon footprint to ship the item, the packaging material that ends up in a landfill, and/or the chemicals used to make the packaging, and the like.

Marketplace 102 also includes awards component 220. Awards component 220 generates an award campaign data structure 264 corresponding to campaign-specification data structure 226. Awards campaign data structure 264 includes awarded job units 266 and 268 corresponding to job specifications 228 and 230, respectively.

As mentioned above, job specifications of campaign specification data structure 226 may include a job type selected from a direct mail campaign catalog, a direct mail campaign advertising and direct mail non-printable services. The selectable job types selectable from each of these will now be discussed in more detail below.

Direct Mail Campaign Catalog

Figure 3:
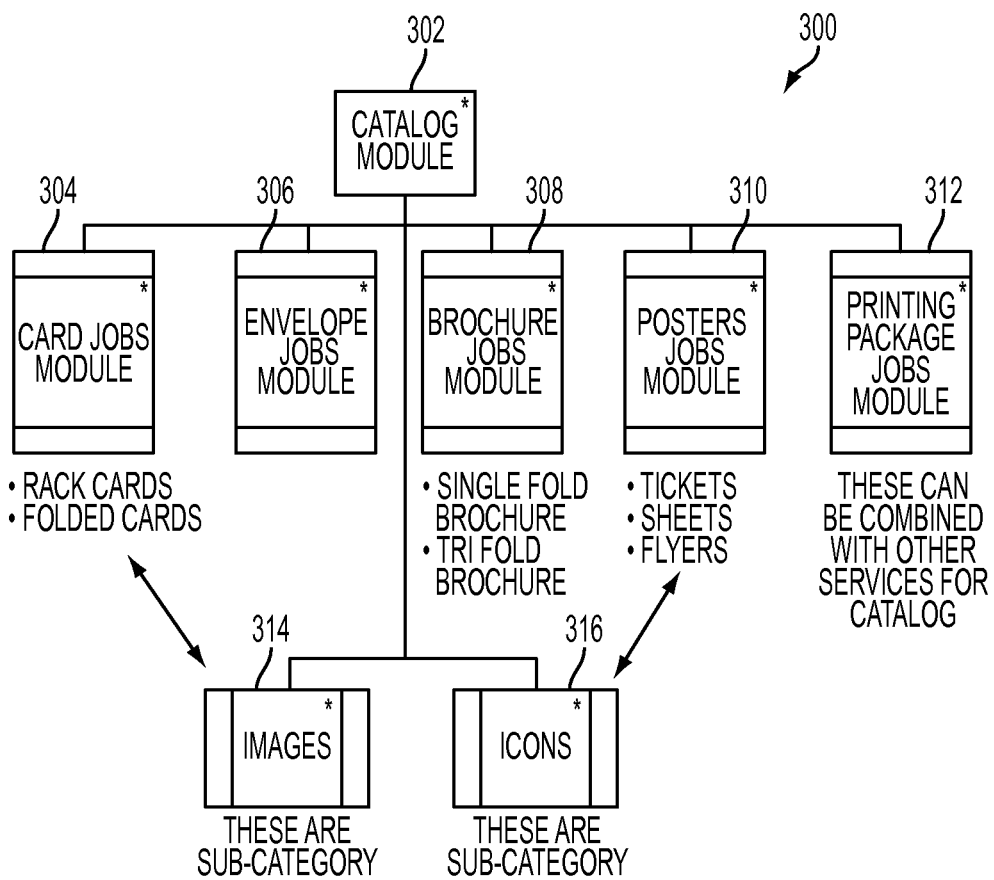
FIG. 3 shows the catalog model of the direct mail campaign catalog in accordance with the present disclosure.

Referring to FIG. 3, direct mail campaign catalog structure 300 is shown. Structure 300 includes catalog module 302, card jobs module 304, envelope jobs module 306, brochure jobs module 308, poster jobs module 310, and printing package jobs module 312. Structure 300 also includes sub categories of images 314 and icons 316. Structure 300 may be a data structure, an object (e.g., a C++ object), a hierarchical data type, a database structure, an organization structure, a job type structure, and the like. Structure 300 can organize the overall structure of job creation and can provide templates for job specification creation. e.g., job specification 228 of campaign specification data structure 226.

When utilizing a card jobs module 304, the buyer can create one or more card jobs that are specified to be created from a master design or an aggregation of other pieces from the direct mail job that may be processed and/or personalized during the manufacturing process. Multiple card services may also be part of direct mail campaign catalogs that are related to card jobs. Card jobs specified within campaign specification data structure 226 may include pricing information (or may be considered a type of job) and can include parameters such as card paper, card ink, aqueous coatings, rack cards, post cards, folded cards and the like. The print type of the cards can be determined by an algorithm for direct mail printing such that the optimal print type for the job specification is calculated. The job specification 228 and/or 230 (of FIG. 2) may be created based on paper options, e.g., 120# Gloss Cover or 100# White Cougar Cover. The data collection is done through the sourcing engagement where the Request for Proposal (RFP) during stage A of FIG. 1 is created for each service and facilitating the creation of a grid which is dynamic so that different paper options may be supported during RFP creation.

When utilizing the envelope jobs module 306, workflow 252 of FIG. 2 may be used such that the buyer 108 of FIG. 1 can create one or more envelope jobs that specify the creation of masters or other pieces for direct mail that will be processed and personalized in the manufacturing process. To source and print envelop jobs, multiple card services may be created. Each service may have single or multiple pricing points, and single or multiple environmental impact assessments or parameters. Envelope services may include envelope prepress, envelope press, envelope paper, envelope ink and the like. A software program can include an algorithm that determines an optimal price to be used in direct mail printing as specified by job specifications 228 and/or 230 of FIG. 2 and/or optimal environmental impact.

When utilizing the brochure jobs module 308, workflow 252 of FIG. 2 may be tailored such that the buyer 108 of FIG. 1 can create one or more brochure jobs and require the creation of masters or other pieces for the direct mail job that will be processed and personalized in the manufacturing process. To source and price brochure jobs, multiple card services may be created. Each service may have single or multiple pricing points, and single or multiple environmental impact assessments or parameters. Brochure services include brochure size, brochure paper, brochure ink, aqueous coating, folding, brochure type, single-fold, tri-fold, and the like. A computer application can include a print type determination algorithm to calculate the optimal print type for job specifications 228 and/or 230 of FIG. 2 and/or optimal environmental impact. Job specifications 228 and/or 230 may correspond to brochure size, paper options, ink, aqueous coating, folding, and the like. Rates for these services are collected through sourcing, e.g., during stages A, B, or C (see FIG. 1) and an optimum price calculation or optimal environmental impact may correspond to a vendor of vendors 110 based on the job specification, e.g., job specifications 228 and/or 230 of FIG. 2.

When utilizing poster jobs module 310, workflow 252 of FIG. 2 may be generated such that the buyer 108 can create one or more poster jobs that require the creation of masters or other pieces that will be processed and personalized in the manufacturing process. To source and price poster jobs, multiple card services may be created. Each service may have single or multiple pricing points. Poster services include poster paper, posters ink, aqueous coating, poster type, e.g., tickets, sheets and flyers, and the like. A computer application can include a print type determination algorithm that calculates the optimal print type corresponding to job specifications 228 and/or 230, and/or the optimal environmental impact. The price calculation may be based on the quantity and the services offered. The catalog component workflow as shown in FIG. 3 can use multiple components such that the manipulations of catalog products into individual pieces for the distribution process are possible.

The printing package jobs module 312 may additionally be included as part of workflow 252 of FIG. 2 and may be used such that the buyer 108 of FIG. 1 can create one or more printing package jobs. Printing package jobs module 312 may be combined with other modules and/or various kinds of jobs related to or directly correlating to print jobs.

Direct Mail Campaign Advertising

Direct mail campaign advertising may include mail preparation, shipping services, direct mail targeting services, market research, newspaper insert services, campaign results services, and newspaper insert services for job type selection. Advertising can utilize mail preparation services and other delivery services to ship advertising materials including post cards, letters, brochures, catalogs, and flyers. Campaign specification data structure 226 of FIG. 2 may request creative, responsive generation of adverting material. Utilizing a direct mailer can assist in targeting the people and businesses most likely to respond, avoids wasting money on sending mail to those you will never hear back from, and achieves a higher return on investment. The direct mail campaign advertising services include a full range of different options suited to meet campaign needs. Direct Mail campaign advertising can be a cost effective way of advertising, especially if mailings contain printed material. This is due, in part, to cost advantages obtained by printing in high volume, since the majority of print costs are realized when a printing machine is initially setup to run a print job and not because of the quantity of material printed. Thus, the total cost of printing 50,000 postcards is only slightly higher than printing 20,000 postcards, but when the total cost is divided by the number of cards printed, the cost per card drops more dramatically as more pieces are printed.

Advertising jobs consist of the following services: market research, newspaper inserts, evaluation of campaign results services, and the like. Components are used to model the above. A newspaper insert component facilitates the creation of specifications 228 and/or 230 such that capable vendors can have a price preview calculated to give the best possible rates to buyer 108 for different types of newspaper inserts, and/or facilitate the achievement of environmental objectives by the buyer 108. When the newspaper insert component is utilized, the following options are available as part of job specifications 228 and/or 230: inserts with different shapes, inserts with different objects (e.g., keys, CDs, coins, stamps), and the like. Shipping and delivery requirements are defined within job specifications 228 and/or 230. A market research component allows specifications 228 and/or 230 to manage the advertising campaign as specified by campaign specification data structure 226 of FIG. 2 and corresponds to the following services: media market research services (which define the advertising channels) and geographic scope services (which define the scope of the campaign (e.g., international, regional, local), and the like. A campaign evaluation service may be used to measure the results of carrying out the campaign (such as pre-campaign measurement and post-campaign measurement of customer awareness).

The separate direct mail organization might be created to access vendors of vendors 110 with direct mail capability (this could be done on the buying organization level rather than a per job level). Vendors can configure different advertising media capabilities. Job optimization can include using the most economical advertising service and/or the least environmental impact. Additionally or alternatively, job optimization can also include using one or more algorithms to minimize negative environmental impacts and/or increase positive environmental impacts. If the rates for a service are available, the list of capable vendors for each campaign advertising job within the campaign is generated and the bidding process can start. Campaign functionality may also manage information from each campaign advertising to calculate the best preview price and best vendor. After the bidding process is completed, the buyer can award each individual advertising job contained within the campaign to selected vendors of vendors 110. The campaign modality allows jobs to be split among multiple capable vendors (with the campaign as the "sum of the whole"). Overall, this process allows buyers 108 and/or DAs 106 of FIG. 1 to include campaign advertising as part of the direct mail campaign in the total print volume they procure for their clients and thereby achieve greater savings.

Direct Mail Non-Printable Services

Direct mail non-printable services can also includes several job types giving a buyer 108 (see FIG. 1) the ability to add non-printable services including legal services, notary services, translation services, file conversion services, security services, and the like. To be able to price these services, workflow 252 can include these job types therein. Each workflow may have one or more associated job types. Direct Mail non-printable services may include job types of campaign legal jobs, campaign translation jobs, and the like. Each of these jobs may have different components.

For legal services, a legal job as specified by job specifications 228 and/or 230 can facilitate buyer 108 to "find" capable vendors of vendors 110, display preview prices for each vendor for performing the job, and find the best rates for the copyright services, hourly training services, direct mail notary services, and the like. The pricing for these services can be based on the rate cards rates collected through the sourcing process as well as non-rate card pricing based on the capable vendors bid and/or vendor preferences.

The translation services facilitate DA 106 in executing the multilingual campaign in a personal, timely, and affordable manner. To create and price translation services, a direct mail translation component may be utilized. This component can be defined within job specifications 228 and/or 230. For campaigns including direct mail aspects such as translation services, the preview price can be calculated based on the vendor rates available through the bidding process. Different pricing models are available based on the vendor preferences 270 e.g., by pricing per lines count, hourly-based prices, and the like.

These aspects of a campaigns enhance the business process of the campaign because a buyer 108 has the ability to model and price all activities by creating the campaign specification data structure 226 starting from the marketing perspectives and to the estimation of the effectiveness of the direct mail campaign.

Environmental Impact Assessments

Broker 104, vendors 110, and/or Buyer 108 can take steps to find environmentally preferable printing practices and processes. For example, buyer 108 may want to utilize vendors of vendors 110 that engage in environmentally sensitive production practices to achieve its environmental objectives. For example, one or more of broker 104, buyer 108, and/or vendors 110 may have internal as well as external environmental objectives, may seek ways to reduce the environmental impact of their print projects, and/or may currently have no indication of the wastage associated with the portions of the campaign that occur externally to the entity.

Figure 5A:
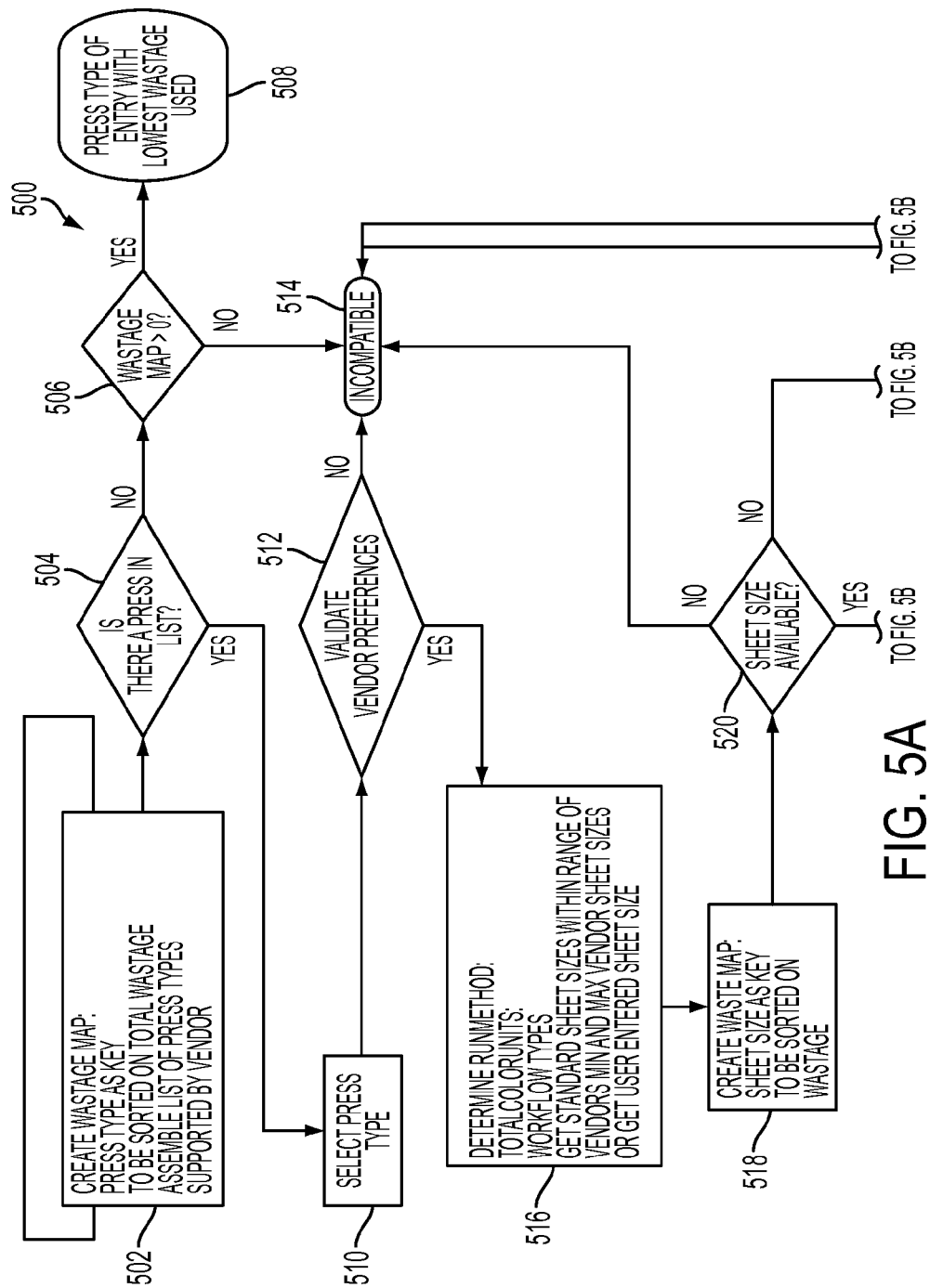
FIG. 5 includes subparts FIGS. 5A-5B and shows a flow chart diagram of a manufacturing waste algorithm which is a portion of a press type determination algorithm in accordance with the present disclosure.

By utilizing environmental impact assessments, broker 104 and buyer 108 have a pricing mechanism to assess a vendor of vendors 110's (e.g., a print supplier) generation of waste that can potentially harm the environment in their production methodology. By using environmental impact assessments, broker 104, buyer 108 and/or a vendor of vendor's 110 can quantify the impact and seek to minimize (or reduce) various kinds of waste in the print procurement process and/ or minimize (or reduce) the impact of the production methodology on the environment. Using a pricing based mechanism (e.g., the green weighted price value) facilitates internal and external customers to vendors 110 to modify their procurement process to include waste minimization and/or environmental impact aspects in their procurement decisions. For companies that print documents regularly and/or in high volume, choosing an environmentally committed printer may be a component of green procurement. For example, buyer 108 may prefer to use a vendor of vendor 110 that engages in environmentally friendly practices despite an increase in cost. Additionally or alternatively, one or more wastage calculations may be made during the processing of a press-type determination algorithm (e.g., as shown in FIG. 5 and discussed below).

In addition to the pricing, buyer 108 may take into account various environmental impact assessments such as "green" factors in the vendor selection process. The "green" factors may be based on the minimal wastage calculation for each supplier during the utilization of a press-type determination algorithm. All data points required for the job specific waste calculations may be collected via vendor preferences during stage C as shown in FIG. 1 for electronic storage in a vendor's profile of one or more of vendors 110.

Referring to FIGS. 1, 2, and 4, FIG. 4 shows a web-browser based view that buyer 108 may see using a graphical user interface in communication with marketplace 102. Additionally or alternatively, FIG. 4 is viewable by DA 106. The view of FIG. 4 shows preview prices 402 for vendors (e.g., suppliers 404) in accordance with the present disclosure. Note that several of the prices are listed as incapable thereby signifying that the respective supplier of suppliers 404 having a preview price 402 of "incapable" cannot perform the job. The preview price for all capable vendors is calculated by marketplace 102 and may be shown as shown in FIG. 4. Based on the calculated preview prices 402, DA 106 can make procurement decisions of which vendor of suppliers 404 (suppliers 404 are each one of vendors 110 of FIG. 1) of vendors 110 to invite for participation in bidding process for one or more jobs as specified by the campaign specification data structure 226.

DA 106 can award jobs as specified by campaign specification data structure 226 as a function of the minimum wastage indicated by a particular job specification 228 or 230 to facilitate buyer 108 in meeting its environmental goals. This facilitates DA 106 to review a vendor of vendor's 110 capabilities from an environmental impact perspective. A vendor of vendors 110 that practices environmentally friendly practices could gain preferences that lead to job awards as specified by campaign specification data structure 226. The wastage data points (e.g., an environmental impact parameter 272 of FIG. 2) may be collected from vendors 110 and entered into database 202 during the sourcing process (e.g., stage A, B and/or C).

Once DA 106 and/or buyer 108 enter in one or more job specifications via campaign specification data structure 226, a list of vendors 110 including some capable of implementing one or more jobs as specified by campaign specification data structure 226 can be created. The preview price 402 is calculated based upon rates collected during the sourcing process as shown in FIG. 4. However, FIG. 4 does not explicitly show the one or more environmental impact assessments 274 unless, as in some embodiments, it is reflected in the preview price. Additionally or alternatively, the "incapable" designation may be from a lack of environmental certification and/or the price may include an environmental impact assessment (discussed below). The preview price 402 as shown in FIG. 4 may be calculated for print jobs during utilization of a press type determination algorithm and/or may be made when implementing the press type determination algorithm.

Referring to the drawings, FIG. 5 shows a flow chart diagram of a manufacturing waste algorithm which is a portion of a press type determination algorithm 500 in accordance with the present disclosure. Algorithm 500 may be implemented in hardware, software, software in execution, using a microprocessor, a microcontroller, a PLD, a PLA, FPGA, CPLD, in virtualization, in microcode, and/or some combination thereof. Algorithm 500 includes steps 502 to 532. Step 502 creates a wastage map using a press type as a key. The wastage map is to be sorted on a Total Wastage Assemble list of press types supported by a vendor 110. In other words, the created wastage map has a list of the press types supported by a vendor of vendors 110 as keys, and total wastage as value, associated with each press type. The created wastage map is sorted by the total wastage value, so that the press types with less wastage would be in at the top of the list. Step 504 determines if there is a press type in the Total Wastage Assembly list. If step 504 determines there is a press type in the Total Wastage Assemble list, then algorithm 500 continues to step 510. Step 506 determines if the wastage map is not empty, if so then algorithm 500 continues to step 508 where the press type with the lowest wastage value from the sorted wastage map is used. Step 506 determines if a wastage map is greater than 0, if not, then algorithm 500 goes to step 514 in which algorithm 500 determines the vendor is incompatible, for example, it is determined if the vendor is not capable based on the press type determination algorithm. Step 510 selects a press type. Step 512 validates vendor preferences. If the vendor preferences cannot be validated, then algorithm 500 determines if the press is incompatible, for example, if the vendor preferences are missing the press type determination would be not able to validate the vendor. If the vendor preferences are validated in step 512, step 516 determines a run method, the total color units, the workflow types, and gets standard sheet sizes within range of vendors min and max vendor sheet sizes or get user entered sheet size; for example, there may be a list of standard media sizes specific to the buying organization and the vendor's min and max media sizes are stored in the vendor preferences. The user may have the ability to enter custom media sizes.

At step 518, a waste map is created using the sheet size as a key to be sorted on wastage, for example, the wastage map has a sheet size as a key and wastage calculated for this sheet size as a value, and the map may be sorted by the wastage. At step 520, it is determined if the sheet size is available. If it isn't, the press is determined to be incompatible (e.g., to step 514) or go to step 524, where it is determined if the waste map is greater than zero, if it isn't, then algorithm 500 proceeds to step 514. At step 528, sheet size with least wastage is selected and set press.ups, press.sheetsize based on this sheet, in other words, at step 528 the sheet size with least wastage is selected and this sheet size is used in the future calculation to calculate number of ups for press service. Then algorithm 500 proceeds to step 532 which determines if the price is available. If so then "end" or proceed to step 530 which "press compatible store total price, store total wastage in wastage map & press type", for example, if the price is available then the vendor is capable and the following information is stored for the display in a Graphical User Interface—total price and total wastage associated to the determined press type.

However, as shown in 500, if a sheet size is available, step 522 calculates Flat size and ups, rotates if necessary; in other words, If the sheet size is available, the number of ups and flat size are calculated and the sheet may be rotated (width and height dimensions switched) if necessary to maximize number of ups. Thereafter, step 526 implements the function as follows: store wastage: ((press.sheetWidth*press.sheetHeight)−(press.ups*Flatwidth*flatheight))/100 and also stores sheet size and ups.

The various kinds of waste that may be calculated for commercial printing are show in table 1 as follows:

TABLE 1 press services wastage (inks, chemicals, paper, VOCs)
post press services waste (folding, die cutting, foil stamping, pocket folder creation, scoring and/or perforating, trimming, UV coating, lamination, etc)
assembly services waste (binding, packaging and fulfilment)

The various kinds of waste that may be calculated for commercial print are shown in table 2 as follows:

TABLE 2 forms press services waste (inks, chemicals, paper, VOCs)
personalization services wastage (imaging, finishing, mail preparation)

Waste calculations for the press services include calculation of the waste generated during setup (i.e., consumed during job make-ready) and waste generated during a run (i.e., items consumed during live manufacturing). Rates for the setup and run waste for the related services are collected during the sourcing process (e.g., stages A through C) and may be stored in database 202 (see FIGS. 1 and 2).

Figure 6:
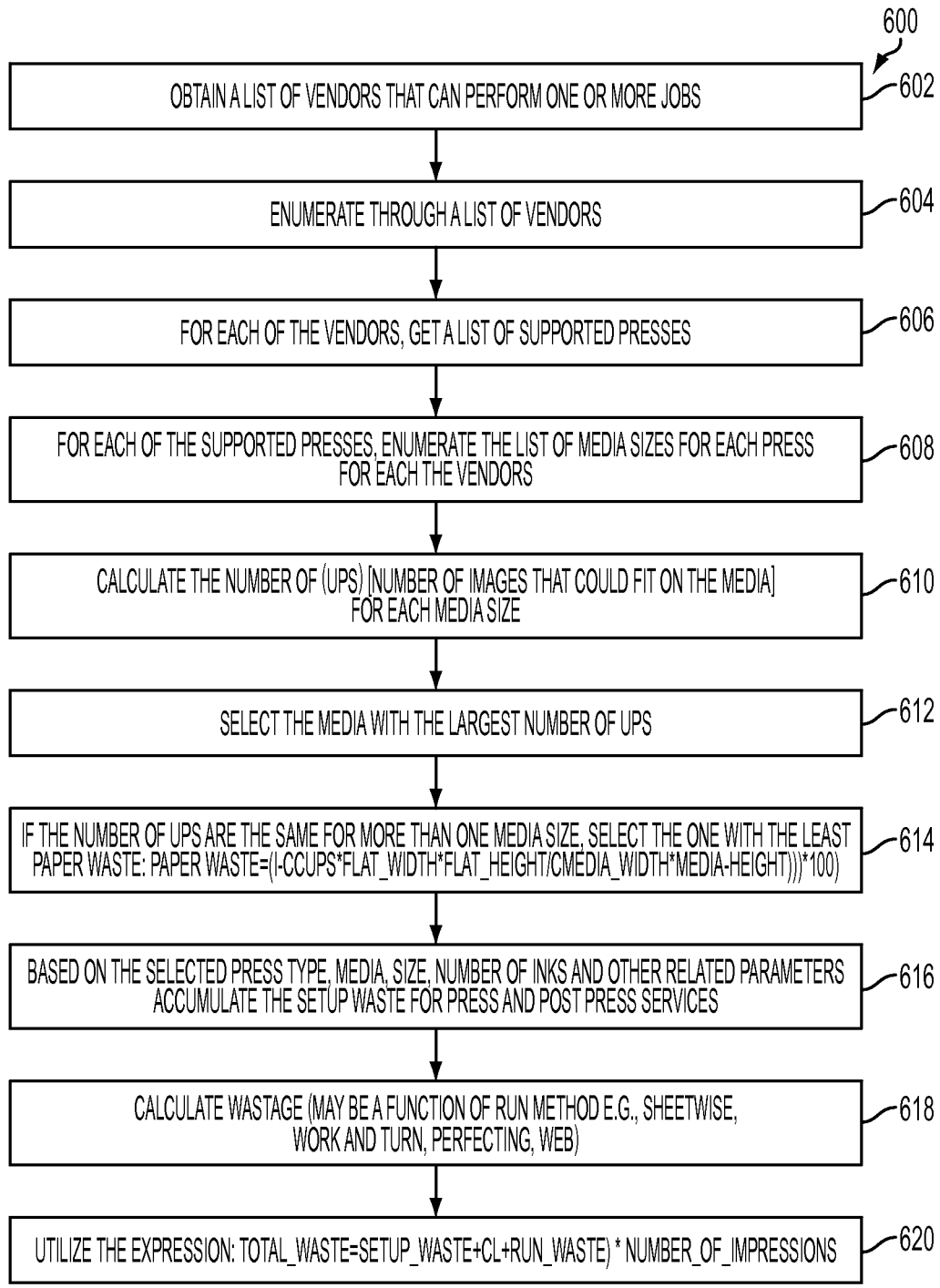
FIG. 6 shows a flow chart diagram of a waste calculation algorithm in accordance with the present disclosure.
Figure 11A:
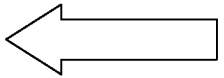
FIG. 11 includes subparts FIGS. 11A-11J and shows a spreadsheet used to calculate trees utilized and/or houses powered per year by using alternative paper and duplexing options in accordance with the present disclosure.
Figure 11B:
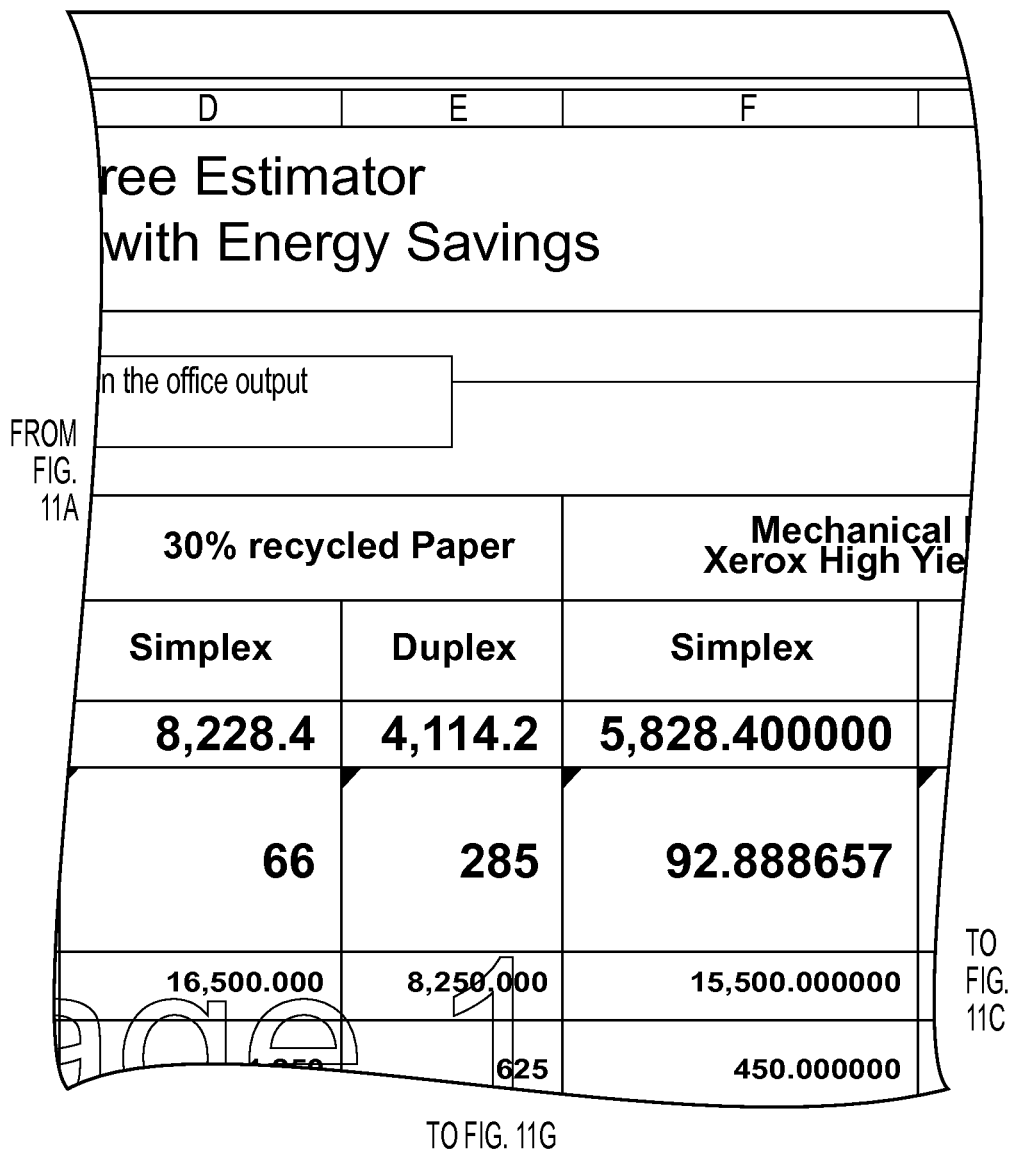
Figure 11C:
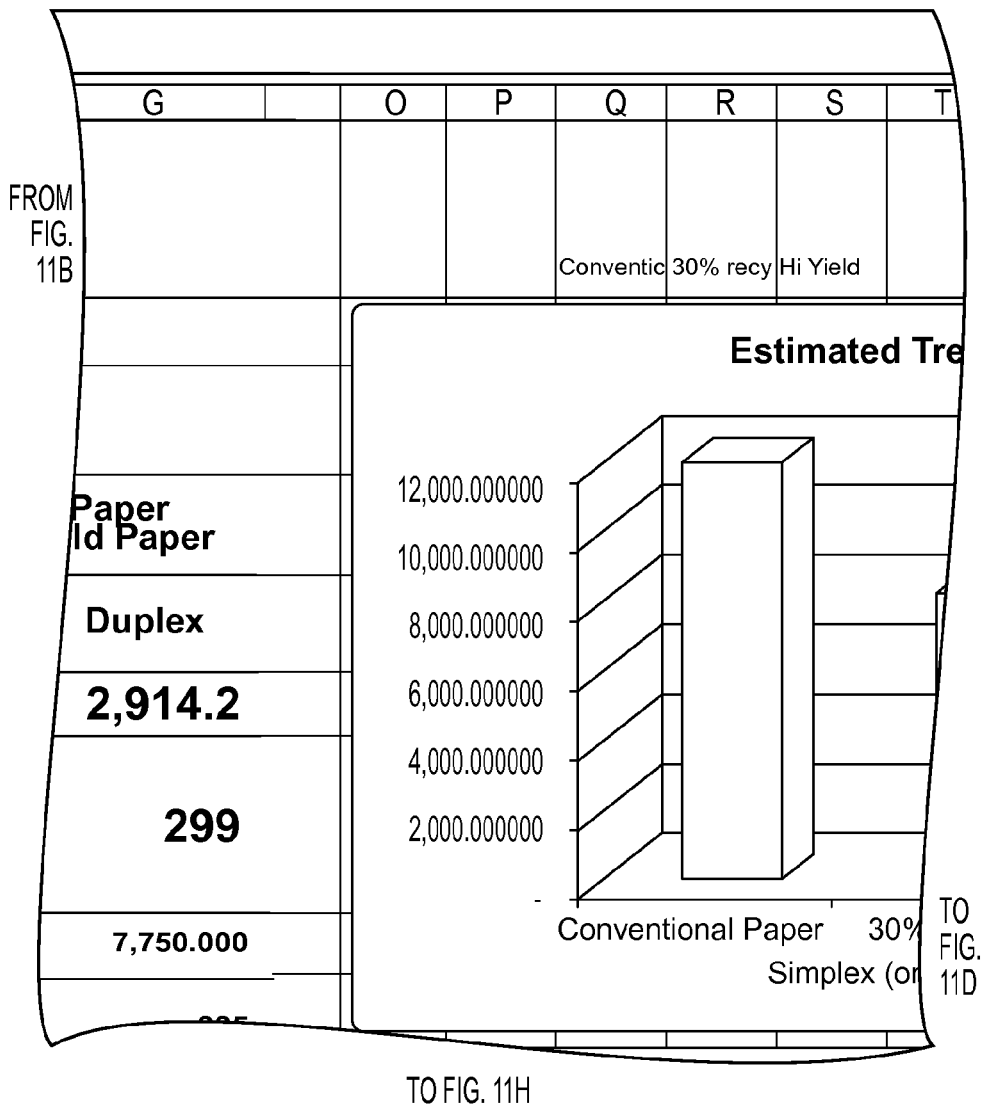
Figure 11D:
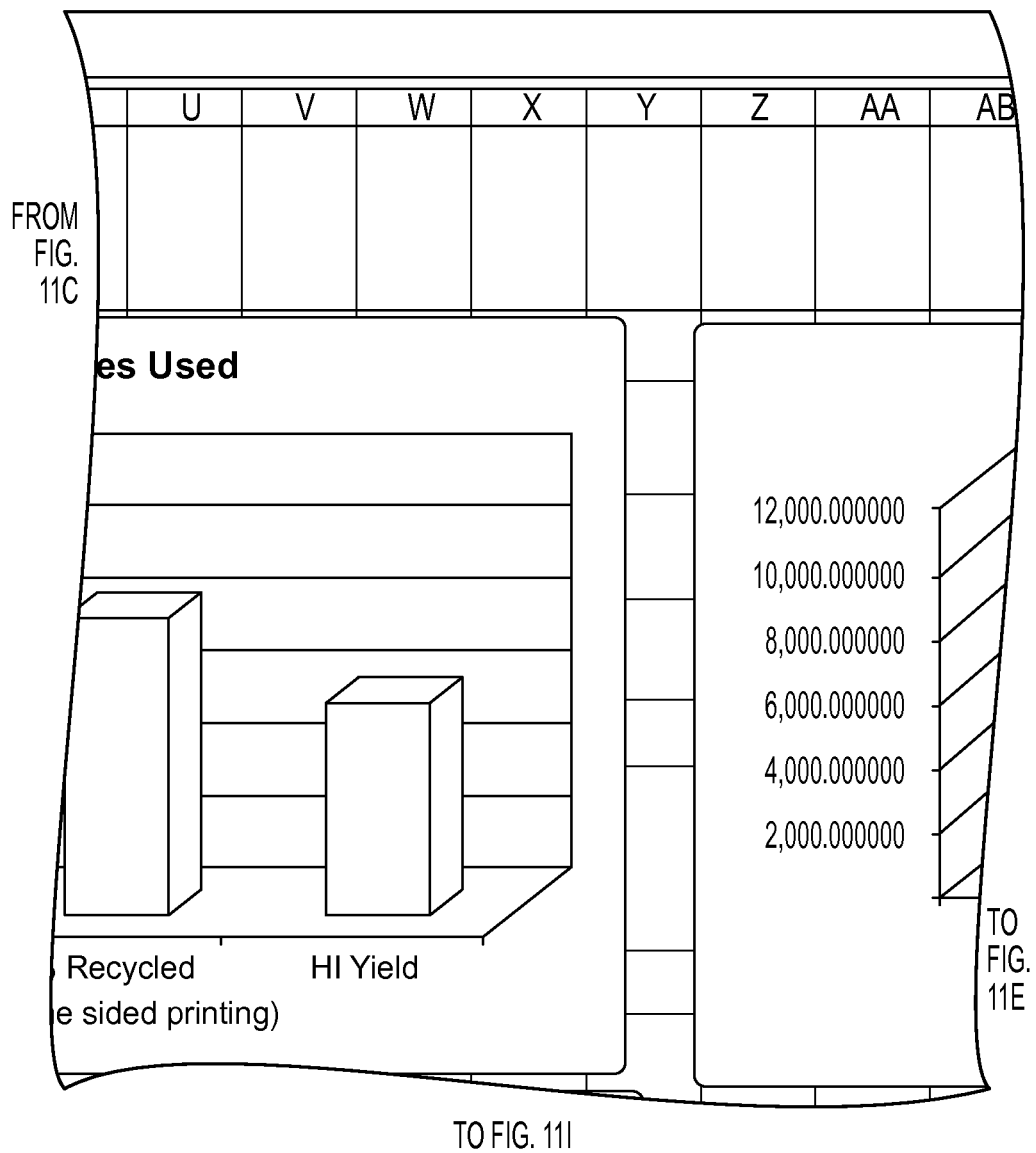
Figure 11E:
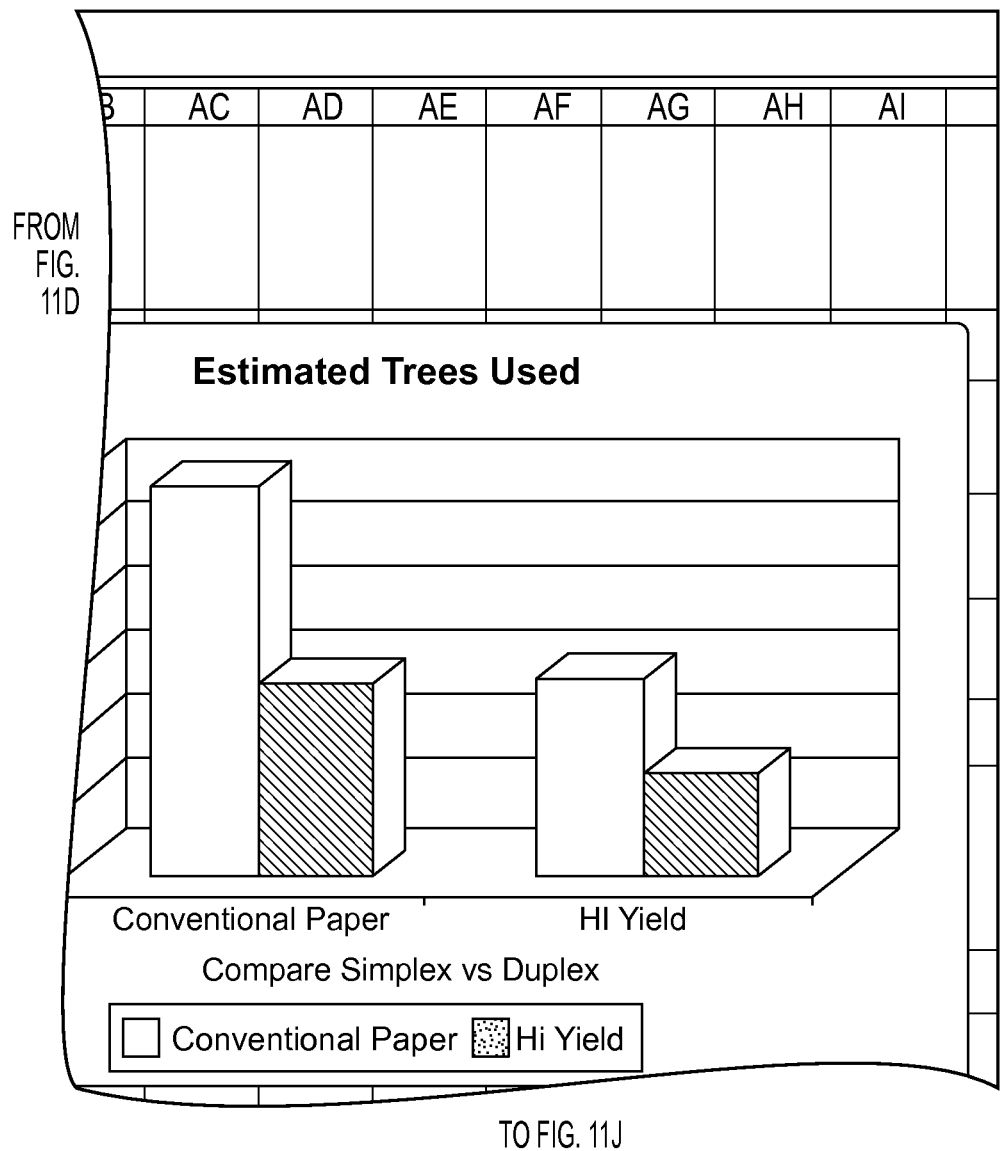
Figure 11H:
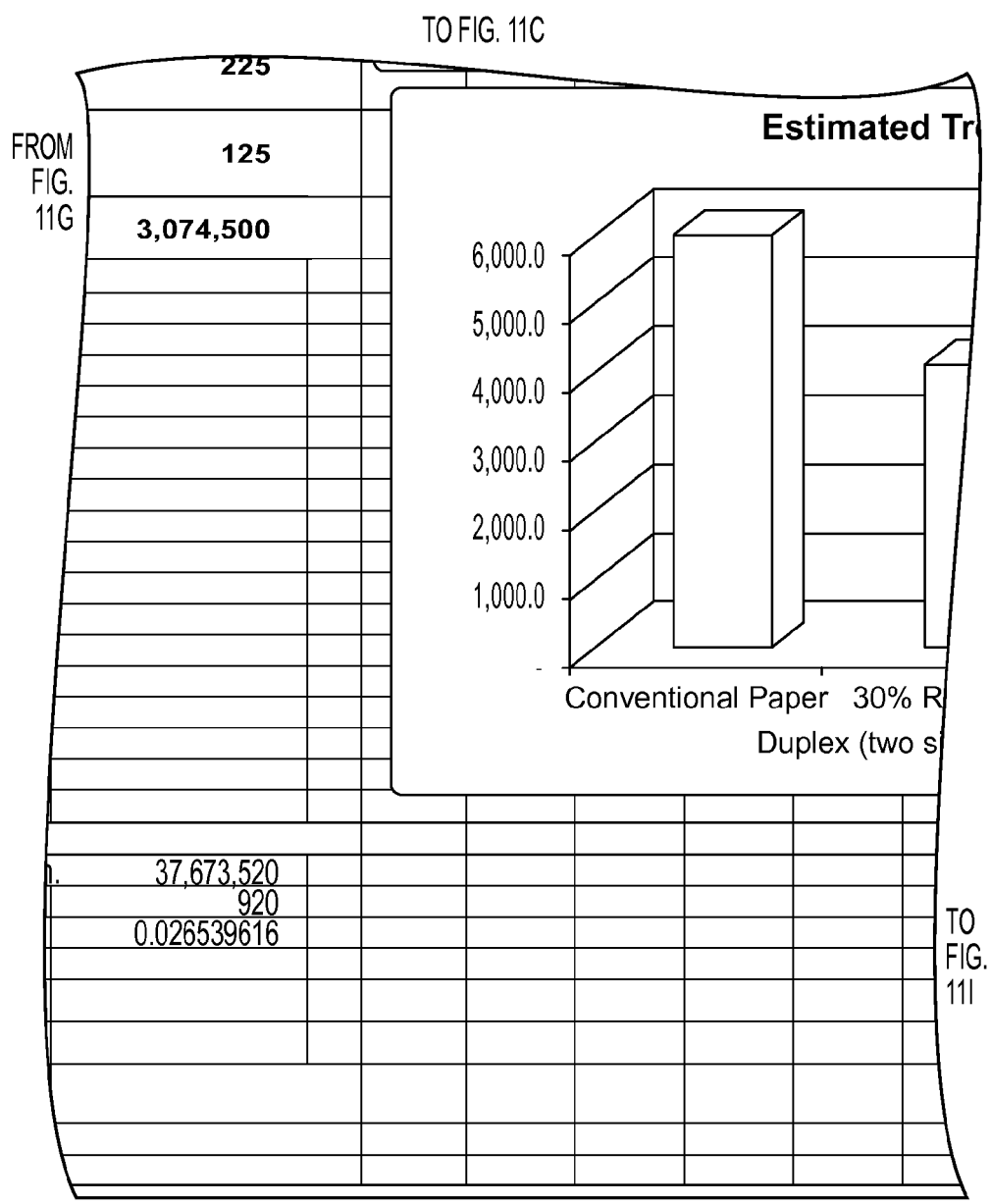
Figure 11I:
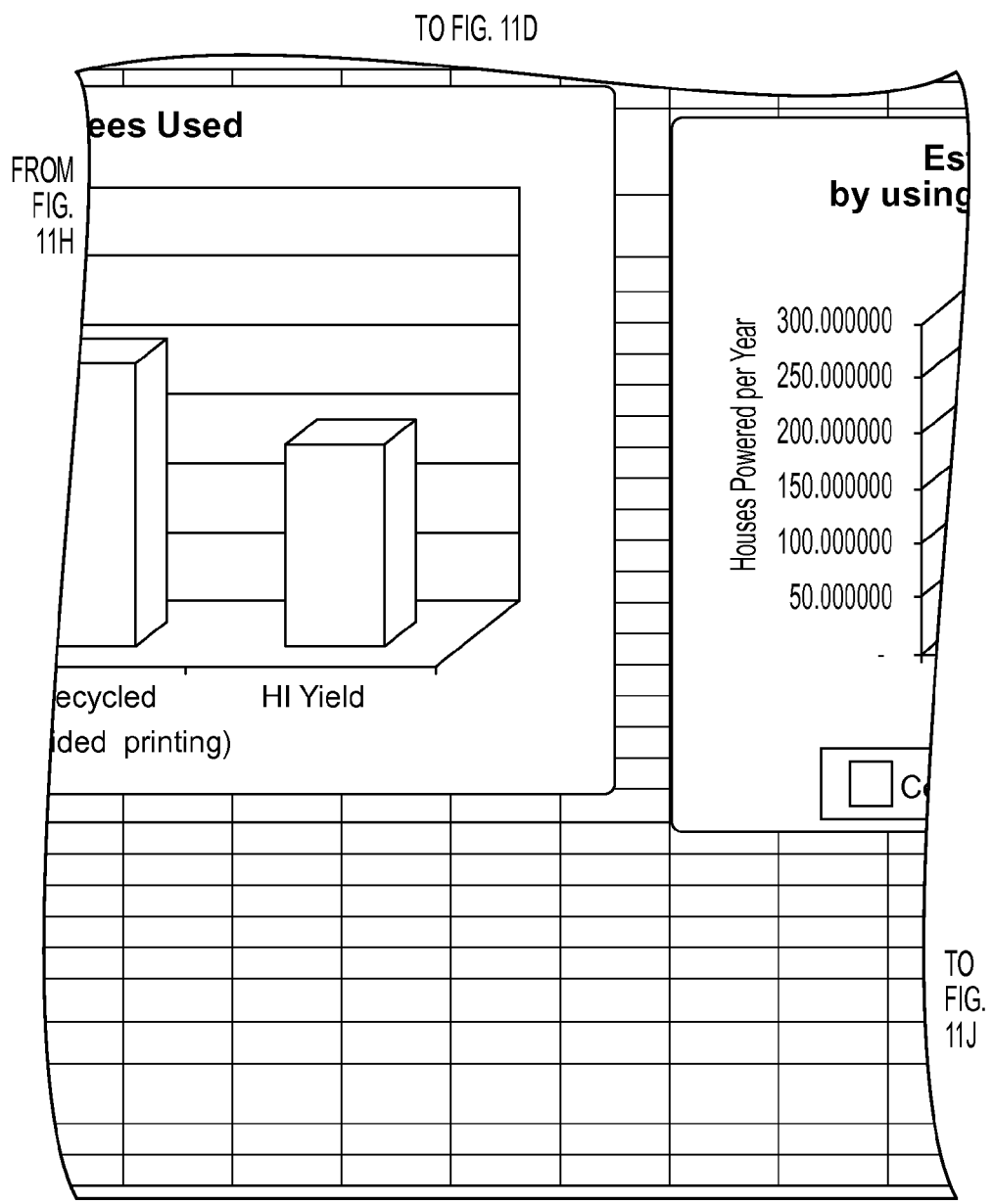
Figure 11J:
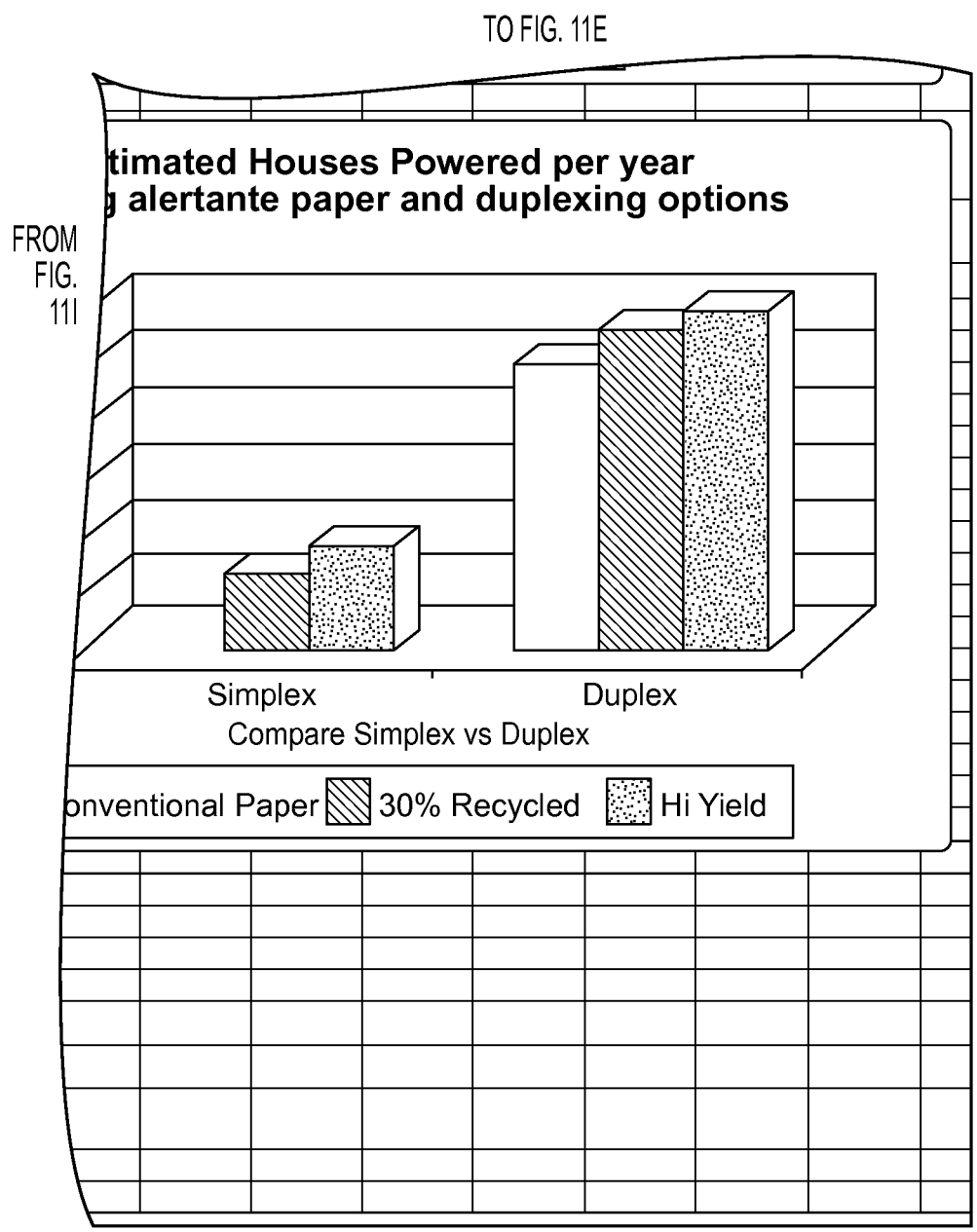

FIG. 6 shows a flow chart diagram of a method 600 of a waste calculation algorithm in accordance with the present disclosure. Method 600 may be implemented utilizing a personal computer, a server-based computer, a processor, hardware, software, software in execution, in virtualization, utilizing CPLDs, PALs, PLDs, FPGAs, one or more servers, firmware, bytecode, microcode, by an operative set of processor executable instructions configured by execution by at least one processor, the like, or some combination thereof.

Method 600 includes steps 602 through 620. Step 602 obtains a list of vendors that can perform one or more jobs, e.g., as specified by a campaign specification data structure 226 of FIG. 2. Step 604 enumerates through a list of vendors. Step 606 generates a list of supported presses for each of the vendors. For each of the supported presses, step 608 enumerates the list of media sizes for each press for each of the vendors. Step 610 calculates the number of UPS [number of images that could fit on the media] for each media size. Step 612 selects the media with the largest number of UPS. Step 614 performs the following: if the number of UPS are the same for more than one media size, method 600 will select the one with the least paper waste using the following formula: PAPER_WASTE=(1−((UPS*FLAT_WIDTH*FLAT_HEIGHT/(MEDIA_WIDTH*MEDIA_HEIGHT)))*100). Step 616 implements the following: based on the selected press type, media size, number of inks and other related parameters accumulate the setup waste for press and post press services. Step 616 calculates the setup wastage, which is part of the total wastage calculation. Step 618 calculates wastage (may be a function of run method e.g., sheetwise, work and turn, perfecting, web, and the like). Step 620 utilizes the expression: TOTAL_WASTE=SETUP_WASTE+(1+RUN_WASTE)*NUMBER_OF_IMPRESSIONS.

If the press type determination algorithm is configured to use the total waste to determine which press type is utilized, then based on the calculated value of the TOTAL_WASTE, the press would be selected and a Preview Price would be calculated (and displayed) base on this press type. If a press type determination algorithm is configured to use the best price to determine which press type is utilized, then the press type would be selected based on the lowest price and that Preview Price would be displayed based upon this determined press type; the total waste would be stored (and/or displayed) together with Preview Price for review by DA. The total waste as well as Preview Price would be available for DA at any time (during bidding process, job awarding, change order, etc) as shown in FIG. 7. FIG. 7 shows the GUI interface as seen by DA 106 including wastage calculations (i.e., a type of an environmental impact assessment). This enhanced functionality gives the DA flexibility to grant jobs to the vendors based on different criteria.

Example #1

Environmental Impact Assessment

Consider a one component, one signature job, with 10,000 net goods and an exemplary comparison between two vendors, Vendor A and Vendor B. If Vendor A has a total number of impressions of 11,500 impressions of which 1,000 is setup waste and 500 is run waste (5% of 10,000), the environmental impact assessment would be (or includes) a press waste factor of 15%. If Vendor B has a total number of impressions of 11,150 impressions of which 800 is setup waste and 350 is run waste (3.5% of 10,000), the environmental impact assessment would be (or includes) a press waste factor of 11.5%. Vendor B may have a low number of setup sheets, and a lower run waste percentage, but a high setup charge and run rate. This would mean less waste but the job could have a higher price. Vendor A may have a higher number of setup sheets, and a larger run waste percentage, but a lower setup charge and run rate; in other words, more waste but a lower price.

Marketplace 102 of FIG. 1 can calculate the number of waste impressions (setup sheets plus run waste) and display that as a percentage of total impressions (along with a Preview Price). DA 106 may want to pay slightly more to an environmentally sensitive vendor to meet the organization's environmental initiatives giving DAs, vendors, and/or brokers a new option for the print procurement processes. In addition to the price based factors, the "green" factors (i.e., environmental impact assessments) become a driver of the print procurement decision making process. Other environmental impact assessments (i.e., green factors) may be used. For example: environmental impact assessments may include (and/or use these as a function of an assessment) usage of recycled paper, special biodegradable chemistry, non-toxic or bio-degradable inks and the like which can be evaluated for each vendor of vendors 110 and entered into a vendor's profile. These items may be used as factors of the print job awarding decision in addition to waste, and/or the like.

As mentioned above, the functionality in marketplace 102 of FIG. 1 allows Document Advisor 106 (e.g., an on-site service personnel) to help the buying organizations (e.g., buyer 108 of FIG. 1) meet and/or exceed their environmental initiatives. By facilitating "green supplier" selection via a process of certifying print vendor's environmentally-sensitive measures, buyer 108 can use that vendor's "green" factor in the job award process. System 100 of FIG. 1 offers reverse auctioning tools for print procurement. These tools allow Document Advisors (DAs) to generate savings for customers of broker 104 by awarding print jobs to vendors 110 who offer lowest pricing and optimum production methods (based upon the vendors contractual rates and manufacturing capabilities).

Environmental impact assessments may be added as new functionality (e.g., as an extension) of a Print Procurement application facilitating Document Advisor 106 in helping the buying organization (e.g., buyer 108) meet and/or exceed its environmental initiatives. The environmental impact assessments may include pricing as a factor in the vendor selection process (e.g., the "green" factors may be included as an element in one or more pricing algorithms).

For example, an environmental impact assessment may be based on (or may be) weighted values calculated for each supplier (e.g., each of vendors 110) during the preview price calculation. All data points required for the job specific weighted values calculation are collected during a vendor "green" certification phase (e.g., during stage C of FIG. 1) that takes place concurrently with rate sourcing and is stored in the vendor's profile (e.g., a profile of each of vendors 110 may be stored). By including this environmental impact assessments ability (e.g., the "green" factoring) in the print procurement process, DA 106 of FIG. 1 will be able to address needs of the rapidly growing number of customers (e.g., vendors 110 and/or buyer 108) emphasizing environmentally preferable procurement options.

As mentioned above, when a DA 106 creates a Commercial Print (offset or digital print) or generates a Direct Mail job specification (e.g., within campaign specification data structure 226) the preview price for all capable vendors is calculated as shown in 4. Based on the calculated preview price a DA 106 may designate or determine which of vendors 110 are invited to participate in a bidding process for the outsourced jobs.

Because many types of buyer 108 have environmental initiatives, they also want to use environmentally sensitive printers (e.g., printers of vendors 110). As an example, some products at Company A may require that suppliers of vendors 110 meet an environmental certification standard or meet other sets of standards, e.g., Company A may require a printer of vendor 110 to carry the Forestry Stewardship Council logo. The certification may mean that the paper was produced in an environmentally responsive manner and the printer was been certified by a Council as environmentally-sensitive. In some embodiments of the present disclosure, DA 106 may be restricted to use only suppliers (e.g., vendors 110) that have a current and valid certification required by Company A. Many companies may be willing to pay a premium to the environmentally sensitive vendors of vendors 110 because of the counterbalancing lesser impact to the environment.

In the embodiment of FIG. 1, DA 106 has the ability to award jobs not just solely on the best pricing but also on the environmental impact assessments (e.g., "green factors") for the particular job specification (e.g., cap specification 228 of FIG. 1). This facilitates DA 106 in reviewing a vendor of vendors 110 (see FIG. 1) capabilities in relation to environmental aspects. The "greener" vendor of vendors 110 may gain preferences that lead to a job awarded that in previous circumstances would not have been achieved.

In some embodiments, the "environmentally sensitive" job awarding workflow may be available to DA 106 depending on the entered organizational and vendor configurations (e.g., buyer 108 may specify green factors or environmental impact assessment settings when generating campaign specification data structure 226). Vendors 110 may be analyzed for "green" factors during the sourcing process. Each green factor and one or more corresponding rates can be stored in a centralized database (e.g., database 202) and associated with each other.

Once DA 106 enters in a job specification (e.g., job specifications 228 or 230) a list of vendors 110 capable to produce the job is created and one or more preview prices can be calculated based upon the rates collected during the sourcing process such as during Stage C (see FIGS. 1 and 2). Weighted values may be calculated for each related "green" factor and applied to the preview price calculation algorithm for each qualified vendor.

Part of the preview price calculation may include an algorithm that creates an overall weight value of the "green" factors for the particular supplier (e.g., a vendor of vendors 110). The weight calculation algorithm utilizes job specification 228 and/or 230, the vendor profile stored in database 202, and/or the sourced rates to calculate the overall "green" value for the printer of vendors 110. The weight calculation algorithm may be implemented by calculating component 210 of FIG. 2.

FIG. 8 shows a matrix 800 for calculating environmental impact assessments in accordance with the present disclosure. An environmental impact assessment of using a vendor of vendors 110 may be based upon a Streamlined Life Cycle Assessment (SLCA) methodology. Matrix 800 may be similar or identical to, or utilize an Environmentally Responsible Product Assessment Matrix (ERPA). In the ERPA matrix, multiple categories are used to compute an aggregate "green" score.

Each column in matrix 800 represents five green evaluation categories: Materials choice, Energy use, Solid residue, Liquid residue and Gaseous residues. Each row corresponds to one of a vendor of vendors 110's evaluating factors. For each evaluating factor, if it is environmentally beneficial or has no impact it is given a value of one. If there is a negative environmental impact or it is not applicable, it is given a value of zero. The "green" factor for the vendor is calculated as a sum of all values in the corresponding row by using formula (I) as follows:

$$\text{Green Factor} = \Sigma\Sigma \text{ERPA } i,j \qquad (1)$$

Where 0 represents the worst possible and 5 represents the best possible.

During the sourcing process such as Stage C of FIG. 1, the supplier (e.g., one vendor of vendors 110) can be analyzed for the "green" factors using an ERPA matrix that is part of the software (e.g., the software of marketplace 102 of FIG. 1). The following factors shown below in Table 3 may be taken into account for each environmental impact assessment, may be utilized to determine if a vendor has satisfies a predetermined certification status or may be submitted as a vendor preference (e.g., as an environmental impact parameter associated with a vendor), and is shown as follows:

TABLE 3

| Type | Factor |
| --- | --- |
| Prepress | Non-hazardous chemicals and finishers for plate making |
| Prepress | Fully digital prepress (eliminating the photochemical process) |
| Prepress | Electronic imaging |
| Prepress | Use of pre-sensitized plates that are processed with water rather than chemicals |
| Press | Use of waterless offset printing |

TABLE 3-continued

| Type | Factor |
|---|---|
| Press | Minimization of color changes |
| Press | Run similar jobs back to back to reduce waste generation |
| Press | Dedicated presses for specific inks or ink combinations |
| Press | Use of web detectors and automatic splicers |
| Press | Use of cooling to reduce evaporation |
| Press | Alcohol-free printing |
| Paper | Use of FSC or similarly certified paper for printing |
| Paper | Use of recycled papers |
| Ink | Use of non petroleum-based inks |
| Ink | Use of inks without heavy metals |
| Ink | Use of automatic inks levelers to keep optimal levels |
| Post press | Use of water based or hot glue adhesives rather than solvent based adhesives |
| Post press | Use of mechanical binding method instead of glue |
| Post press | Bindery waste reduction efforts |
| Post press | Bindery waste recycling efforts |
| Other | Recycling of supply and product containers (i.e., drums, plastic bottles, etc) |
| Other | Facility-wide program for recycling (i.e. toner and ink cartridges, aluminum cans, office paper waste, etc) |
| Other | Use of recycled and/or biodegradable wrapping supplies, shipping cartons, pallets, etc |
| Other | Use of the renewable energy sources (wind power) |
| Other | Recovery of solvents with on-site distillation equipment |
| Other | Using "lean processes" that reduce waste (i.e., LDP) |

Referring to the drawings, FIG. 9 shows a GUI interface that a vendor 110 (of FIG. 1) may view when interfacing into advanced sourcing workbench 114 of FIG. 1. In other embodiments, a document advisor 106 may have full, partial, or other level of access to the advanced sourcing workbench 114 of FIG. 1. FIG. 9 shows a screen for submitting data e.g., information relating to the factors as shown above in Table 3. The information inputted may be stored in marketplace 102 of FIG. 1 in a database 202 as shown in FIG. 2. The information transmitted utilizing the GUI interface as shown in FIG. 9 may relate to a particular vendor of vendors 110 of FIG. 1 and may be used to calculate an environmental impact assessment, a price offset related to an environmental impact, the suitability of being certified by a predetermined certification having a predetermined set of criteria, may be used to calculate a green factor, and/or may be utilized within a Environmentally Responsible Product Assessment Matrix (ERPA).

After the green factors are collected such as during Stage C as shown in FIG. 1, the weighted pricing factors may be calculated by the following methodology: (1) a normalized green factor is calculated as a difference between a base line (industry standard) value for that factor and the vendor's values, and (2) the green weighted price value may be calculated as an actual price (price without green factor weights)+ weighted price for each related factor (price for each factor multiplied by the Normalized green factor and divided by total green score).

Example #2

Environmental Impact Assessment Comparison of Two Vendors

With reference to FIG. 10, consider two vendors as shown: Vendor 1 and Vendor 2. Vendor 1 and Vendor 2 may be two of vendors 110 of FIG. 1. Vendors 1 and 2 have a Base Green Score of 3. Assume that the total green score (the max green score if each column in a corresponding row in an ERPA matrix is 1) is equal to 5. An exemplary ERPA matrix is discussed above.

Vendor 1 may have a plate making price of 100, a printing price of 500, a plate making green score of 0, a printing green score of 0. The normalized plate making score would be equal to 3−0=3. The normalized printing score is equal to 3−0=3. Therefore, the Green Weighted Price for Vendor 1 is equal to 600+(100*3/5)+(500*3/5)=960.

A Vendor 2 may have a plate making price of 200, a printing price of 400, a plate making green score of 5 and a printing green score of 4. The normalized plate making score would be equal 3−5=−2 and the normalized printing score would be equal to 3−4=−1. Therefore, the Green Weighted Price for Vendor 1=600+(200*−2/5)+(400*−1/5)=440.

Note that by being environmentally responsible, a vendor may have a green weighted price much lower than their competitors, facilitating buyer 108 in making a comparison between vendors of vendors 110 based upon environmental aspects, e.g., by utilizing environmental impact assessments 274 of FIG. 2.

The green factors may be collected and assigned a predetermined factor and weighted pricing factor. Each green factor may have a ranking from 1 to 5, based upon a scale of 1 being of some importance and 5 being of highest importance. The green factors may apply to both specific material and manufacturing processes as well as to general company-wide policies.

Each of these items (green factor and weighted pricing factor) are fully configurable and can be modified to mirror a specific buying organization's environmental interests (document advisor 106 or buyer 108 of FIG. 1) may make the configurations. The relationship of the two values may be roughly parallel in nature, or can be divergent, again based upon each specific buying organization's desires.

The factors and values, stored in database 202 of FIG. 2, have at least two purposes: (1) contribute to a vendor's "Green" rating (a vendor of Vendor 110 of FIG. 1); and/or (2) contribute to a Green Weighted Preview Price that's adjusted positively for environmental sensitivity.

Prepress Green Factors Used for Environmental Impact Assessments

As an example of Prepress "green" factors assessment, the following questions (including, but not limited to those listed above) may be asked of a vendor of vendors 110 (see FIG. 1) and are shown in Table 4 as follows:

TABLE 4

Do you use non-hazardous chemicals and finishers for platemaking?
Is your prepress fully digital?
Do you have electronic imaging?
Do you use pre-sensitized, water-processed plates?

The following formulas may be used and are shown in Table 5 as follows:

TABLE 5

The Sum of Green Factors = Prepress Green Factor
Sum of Pricing Factors = Prepress Green Pricing Facto
Prepress Price + (Prepress Price * Prepress Green Pricing Factor) = Green Weighted Prepress Price Press Green Factors Used for Environmental Impact Assessments Example questions for Press green factors assessments (including those listed above) that may be asked of a vendor of vendors 110 (see FIG. 1) are shown in Table 6 as follows:

TABLE 6

Do you use waterless offset printing?
Do you minimize color changes?
Do you run similar jobs back-to-back to reduce waste?
Do you dedicate presses for specific inks or ink combinations?
Do you use web detectors and automatic splicers?
Do you use cooling to reduce evaporation
Do you use of automatic ink levelers?
Do you use alcohol-free printing?

The following formulas that may be used are shown in Table 7 as follows:

TABLE 7

Sum of Green Factors = Press Green Factor
Sum of Pricing Factors = Press Green Pricing Factor
Press Price + (Press Price * Press Green Pricing Factor) = Green Weighted Press Price Paper Green Factors Used for Environmental Impact Assessments One approach to assign a Paper "green factor" to a supplier (e.g., a vendor of vendor's 110 of FIG. 1) would be to review the supplier's quantitative numbers (such as waste generated in the production process). During the sourcing process (e.g., Stages A to C of FIG. 1), a consultant of broker 104 can estimate the waste generated with different production options available for each vendor and across all vendors of vendors 110 (see FIG. 1). For each of these options, paper waste may be computed and the result equated to the number of trees that could be saved with waste reduction efforts.

Referring to FIG. 11, assume for the following example: if 500,000 total pages are generated in a print job, and the supplier generates 10% waste, the wasted paper would equate to 5,000 sheets (10 reams). That equates to 6% of a tree as per the "green" spreadsheet as illustrated in the "Tree Estimator", shown in FIG. 11. If a supplier utilizes a less waste-intensive process that generates only 3% waste, that may equate to a savings of 3,500 sheets (or 4% of a tree). By estimating the industry average for the paper "green factor" over a pool of suppliers, a baseline can be established for assigning one or more Paper "green" factors to a specific supplier.

Example questions for paper green factors assessment (including those listed above) that may be asked of a vendor of vendors 110 (see FIG. 1) are shown in Table 8 as follows:

TABLE 8

Do you use FSC or similarly certified paper for printing?
Do you use recycled papers?

The following formulas that may be used are shown in Table 9 as follows:

TABLE 9

Sum of Green Factors = Paper Green Factor
Sum of Pricing Factors = Paper Green Pricing Factor
Paper Price + (Paper Price * Paper Green Pricing Factor) = Green Weighted Paper Price Ink Green Factors Used for Environmental Impact Assessments Referring to FIG. 11, consider that for the ink green factors, the following methodology may be used. The percentage of ink waste that is recycled could be calculated for every 100,000 pages for each supplier. The average value can represent the industry baseline. The difference between that baseline and a specific supplier's actual number is the ink waste avoidance factor. This factor could also be equated to the saved trees value as shown in the Tree Estimator of FIG. 11.

Example questions for paper green factors assessment (including those listed above) that may be asked of a vendor of vendors 110 (see FIG. 1) are shown in Table 10 as follows:

TABLE 10

Do you use non petroleum-based inks?
Do you use inks without heavy metals?
Do you use automatic inks levelers to keep optimal levels?

The following formulas that may be used are shown in Table 11 as follows:

TABLE 11

Sum of Green Factors = Ink Green Factor
Sum of Pricing Factors = Ink Green Pricing Factor
Ink Price + (Ink Price * Ink Green Pricing Factor) = Green Weighted Ink Price Post Press Green Factors Used for Environmental Impact Assessments Example questions for Post Press green factors assessment (including those listed above) that may be asked of a vendor of vendors 110 (see FIG. 1) are shown in Table 12 as follows:

TABLE 12

Do you use water based or hot glue adhesives?
Do you use mechanical binding methods?
Do you have a Bindery waste reduction plan?
Do you have a Bindery waste recycling plan?

The following formulas that may be used are shown in Table 13 as follows:

TABLE 13

Sum of Green Factors = Postpress Green Factor
Sum of Pricing Factors = Postpress Green Pricing Factor
Postpress Price + (Ink Price * Postpress Green Pricing Factor) = Green Weighted Ink Price Other Green Factors Used for Environmental Impact Assessments Example questions for Post Press green factors assessment (including those listed above) that may be asked of a vendor of vendors 110 (see FIG. 1) are shown in Table 14 as follows:

TABLE 14

Do you recycle supply and product containers?
Do you have a facility-wide recycling program?
Do you use recycled/biodegradable wrapping/shipping supplies?
Do you have a solvent recovery system with on-site distillation?

The following formulas may be used as follows: Sum of Green Factors=Other Green Factor. Once the different "green" factors values are assigned, calculated and entered in database 202 of FIG. 2, the green certification part of the sourcing process may be considered completed in some embodiments. These factors can be used in the job awarding decision process when DA 106 of FIG. 1 facilitates the buying of printing jobs. Method 1200 may be utilized when buyer 108 of FIG. 1 has been configured to use the "green" factors in print procurement.

Figure 12:
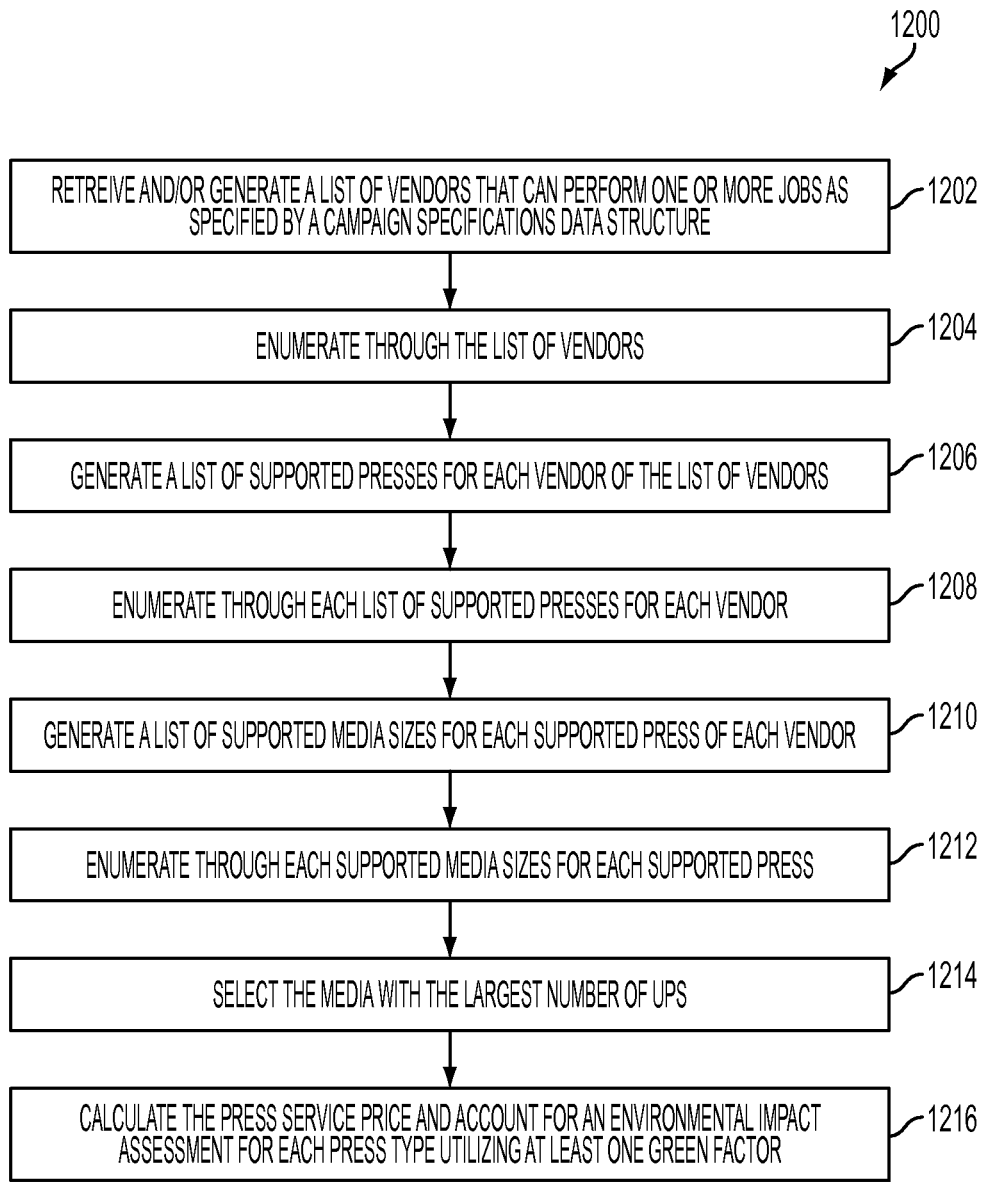
FIG. 12 shows a flow chart diagram of a method for utilizing green factors to determine which press type to utilize within a press type determination algorithm in accordance with the present disclosure.

FIG. 12 shows a flow chart diagram of a method 1200 for utilizing green factors to determine a press type utilized within a press type determination algorithm in accordance with the present disclosure. Method 1200 includes steps 1202 through 1216. Method 1200 may be implemented utilizing a personal computer, a server-based computer, a processor, hardware, software, software in execution, in virtualization, utilizing CPLDs, PALs, PLDs, FPGAs, one or more servers, firmware, bytecode, microcode, by an operative set of processor executable instructions configured by execution by at least one processor, the like, or some combination thereof.

Step 1202 retrieves and/or generates a list of vendors that can perform one or more jobs as specified by a campaign specification data structure. Step 1204 enumerates through the list of vendors. Step 1206 generates a list of supported presses for each vendor of the list of vendors. Step 1208 enumerates through each list of supported presses for each vendor. Step 1210 generates a list of supported media sizes for each supported press of each vendor. Step 1212 enumerates through each supported media sizes for each supported press. Step 1214 selects the media with the largest number of UPS. Step 1216 calculates the press service price and accounts for an environmental impact assessment for each press type utilizing at least one green factor, e.g., the price may be offset by an environmental impact assessment.

Figure 13:
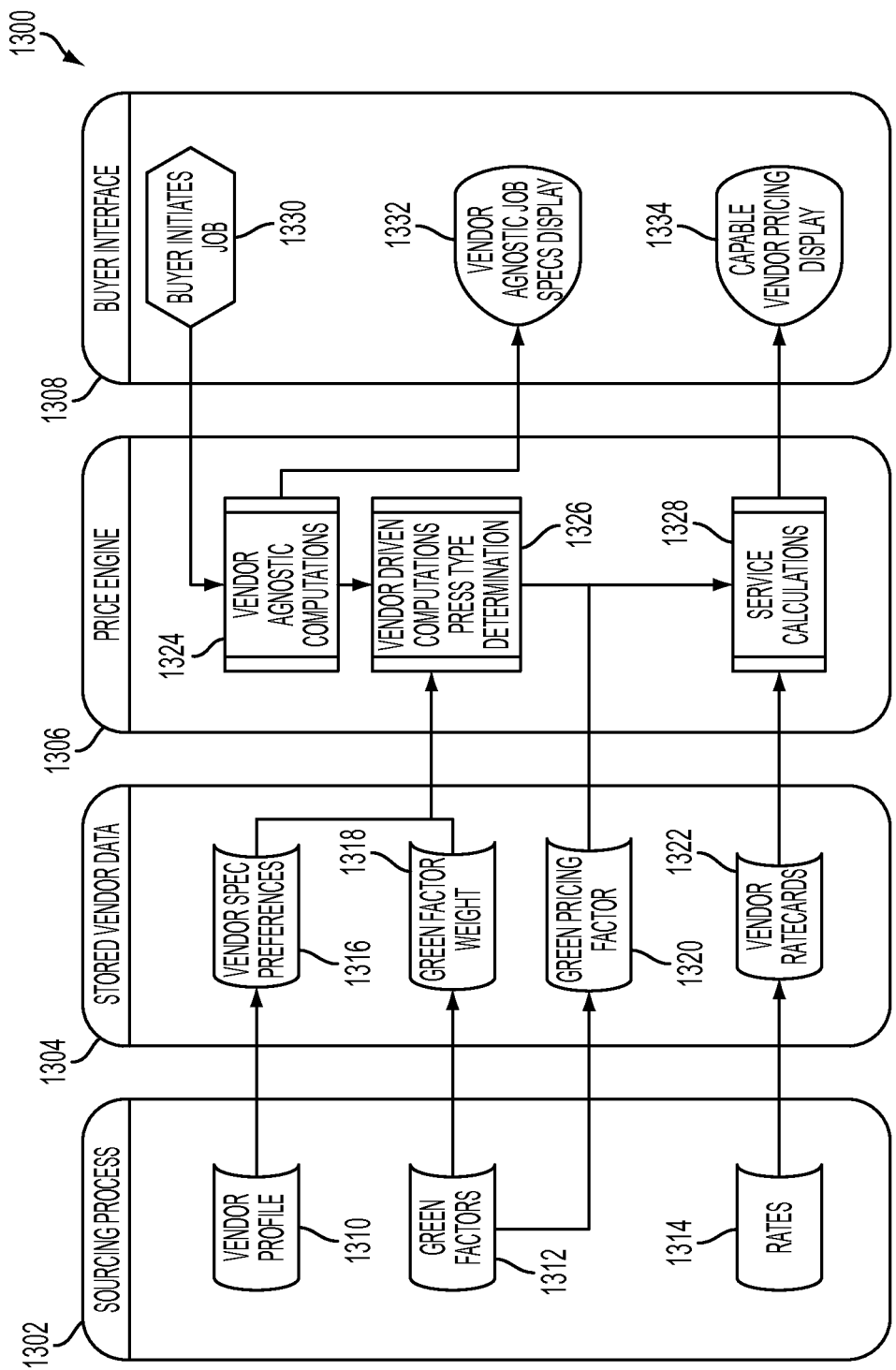
FIG. 13 illustrates software for calculating environmental impact assessments in accordance with the present disclosure.

If a press type determination algorithm is configured to use one or more "green" factors to determine the press type, the press with lower setup and run waste may be selected rather than simply the press with the lowest price. Referring to FIG. 13. marketplace 102 may calculate a Preview Price (using existing algorithms and formulas), the Green Factor (using Green Factor values described above), and the Green Weighted Preview Price (the Preview Price for using the press with the least amount of waste and adjusted for presence of Green Weighted prices for Prepress, Press, Ink, Paper and Postpress.

FIG. 13 illustrates software 1300 including sourcing process 1302, stored vendor data 1304, price engine 1306, and buyer interface 1308. The software 1300 may implement and/or include method 1200 show above. Sourcing process 1302 includes vendor profile 1310 which inputs vendor parameters, green factors 1312 related to each vendor and rates 1314 related to each vendor. Sourcing process 1302 is coupled to stored vendor data 1304 (stored in a database) and includes vendor spec preferences 1316 as entered via vendor profile 1310, green factor weight 1318 as discussed above, green pricing factor 1320 as discussed above, and vendor ratecards 1322 which includes the vendor's pricing data. Price engine 1306 includes vendor agnostic computations 1324, vendor driven computations press type determination 1326, and service calculation 1328. Vendor agnostic computations 1324 can enumerate through the vendor list. Vendor driven computations press type determination 1326 may implement method 1200 as discussed above. Service calculations 1328 can determine which press to use based upon one or more environmental impact assessments. Buyer interface 1308 allows a buyer to initiate a job 1330. Vendor agnostic job spec display 1332 communicates with a vendor for submission of data. Buyer interface 1308 also shows capable vendor pricing display 1334.

Referring to FIG. 14, a GUI displaying screen 1400 is shown and shows the Preview Price 1402, Green Rating 1404, and Green Weighted Preview Price 1406 displayed for each vendor in the user interface for review by the Document Advisor 106 of FIG. 1. FIG. 15 shows the vendors sorted by Green Rating 1404. The DA 106 can sort by Green Factor 1404 to easily identify the most environmentally responsible supplier of vendors 1408. With reference to FIG. 16, DA 106 can sort the list of vendors by Green Weighted Price 1406 as shown in screen 1600. The Preview Price weighted by discounts related to the specific supplier's environmental sensitivities are shown as weighted prices 1406 of FIG. 16.

Referring now to FIGS. 14, 15, and 16, note that UK Demo Bidder 7 had the lowest actual price of £7,168.44. However, UK Bidder 7 only had a Green Factor rating of 14 and, based upon its environmental sensitivities, generated a Green Weighted price of £7,094.78 (however, note that any currency may be used). UK Demo Bidder 2, had an actual price of £7,327.78, but is a more environmentally responsible partner as shown in this exemplary embodiment. UK Demo Bidder 2 has a Green Factor rating of 31 and a Green Weighted price of £6,961.38. Based upon this information, DA 106 can compare the Preview Price 1402 (actual "sell" price) to the Green Weighted Price 1406 that is adjusted for environmental sensitivity. This functionality facilitates DA 106 in awarding jobs to vendors of vendors 110 (see FIG. 1) that have a higher Preview Price 1402 but whose environmental initiatives mitigate the impact of that higher price via green weighted price 1406.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system comprising:
 a processor;
 a database comprising vendor information for vendors, said vendor information comprising printing capabilities and environmental impact parameters associated with each vendor; and
 a computer-readable storage medium in communication with said processor, said computer-readable storage medium comprising one or more programming instructions for assessing environmental impact of processing print jobs by:
  electronically receiving a campaign specification data structure including at least one print job specification;
  selecting a plurality of vendors from said database, each selected vendor being capable of performing a print job as specified by said at least one print job specification of said campaign specification data structure; and
  generating a plurality of environmental impact assessments corresponding to said campaign specification data structure, said plurality of environmental impact assessments comprising prepress factors, press factors, paper factors, ink factors, post press factors, and other factors selected from said environmental impact parameters associated with each vendor,
  each of said plurality of environmental impact assessments being associated with one of said selected vendors.

2. The system according to claim 1, said one or more programming instructions further comprising:
 electronically submitting at least one vendor preference including an environmental impact parameter to said database, said environmental impact parameter being associated with a selected vendor, an environmental impact assessment of said plurality of environment impact assessments being associated with said selected vendor, and said environmental impact assessment being a function of said environmental impact parameter.

3. The system according to claim 1, a first environmental impact assessment corresponding to said campaign specification data structure being wastage.

4. The system according to claim 3, said wastage comprising one of press services wastage, post press services wastage, assembly services wastage, forms press services wastage, personalization-services wastage, setup wastage, and run wastage.

5. The system according to claim 1, said one or more programming instructions further comprising:
   authorizing one or more of said plurality of vendors to perform at least one print job as specified by said at least one print job specification of said campaign specification data structure as a function of a certification of said one or more of said plurality of vendors.

6. The system according to claim 1, said one or more programming instructions further comprising:
   authorizing one or more of said selected vendors to bid on at least one print job as specified by said at least one print job specification of said campaign specification data structure as a function of at least one of said plurality of environment impact assessments.

7. The system according to claim 1, said one or more programming instructions further comprising:
   generating a plurality of prices corresponding to said campaign specification data structure, each of said plurality of prices being associated with one of said selected vendors, said one of said selected vendors being associated with a price of said plurality of prices and an environmental impact assessment of said plurality of environmental impact assessments.

8. The system according to claim 7, said one or more programming instructions further comprising:
   determining a press type of said selected vendor; and
   determining said environmental impact assessment as a function of at least one of said determined press type and said campaign specification data structure.

9. The system according to claim 7, said one or more programming instructions further comprising:
   authorizing a press type of said selected vendor as a function of said environmental impact assessment of said plurality of environmental impact assessments.

10. A system for assessing environmental impact of processing print jobs, comprising:
    a processor;
    a database comprising vendor information for vendors, said vendor information comprising printing capabilities and environmental impact parameters associated with each vendor;
    a computer-readable storage medium in communication with said processor, said computer-readable storage medium comprising one or more programming instructions configured for execution by said processor;
    receiving means that electronically receives a campaign specification data structure including at least one print job specification;
    selecting means that selects a plurality of vendors from said database, each selected vendor being capable of performing a print job as specified by said at least one print job specification of said campaign specification data structure; and
    generating means that calculates a plurality of environmental impact assessments corresponding to said campaign specification data structure, said plurality of environmental impact assessments comprising prepress factors, press factors, paper factors, ink factors, post press factors, and other factors selected from said environmental impact parameters associated with each vendor,
    each of said plurality of environmental impact assessments being associated with one of said selected vendors.

* * * * *